(12) United States Patent
Yamaguchi et al.

(10) Patent No.: US 12,351,730 B2
(45) Date of Patent: Jul. 8, 2025

(54) HARD COAT FILM FOR FOLDABLE DISPLAY AND USE THEREOF

(71) Applicant: TOYOBO CO., LTD., Osaka (JP)

(72) Inventors: Yohei Yamaguchi, Otsu (JP); Kokichi Tokuo, Otsu (JP); Shotaro Nishio, Tsuruga (JP); Kiwamu Kawai, Tsuruga (JP)

(73) Assignee: TOYOBO CO., LTD., Osaka (JP)

( * ) Notice: Subject to any disclaimer, the term of this patent is extended or adjusted under 35 U.S.C. 154(b) by 660 days.

(21) Appl. No.: 17/625,291

(22) PCT Filed: Jun. 30, 2020

(86) PCT No.: PCT/JP2020/025671
§ 371 (c)(1),
(2) Date: Jan. 6, 2022

(87) PCT Pub. No.: WO2021/010158
PCT Pub. Date: Jan. 21, 2021

(65) Prior Publication Data
US 2022/0389269 A1   Dec. 8, 2022

(30) Foreign Application Priority Data

Jul. 12, 2019 (JP) ................ 2019-130036

(51) Int. Cl.
*C09D 167/02* (2006.01)
*C09D 7/61* (2018.01)
*C09D 7/63* (2018.01)
*G02B 1/14* (2015.01)
*C08K 3/22* (2006.01)

(52) U.S. Cl.
CPC ............ *C09D 167/02* (2013.01); *C09D 7/61* (2018.01); *C09D 7/63* (2018.01); *G02B 1/14* (2015.01); *C08K 2003/2241* (2013.01); *C08K 2003/2244* (2013.01)

(58) Field of Classification Search
None
See application file for complete search history.

(56) References Cited

U.S. PATENT DOCUMENTS

| | | |
|---|---|---|
| 4,115,617 A | 9/1978 | Mitsuishi et al. |
| 4,561,724 A | 12/1985 | Otaki et al. |
| 5,429,855 A | 7/1995 | Kotani et al. |
| 5,833,880 A | 11/1998 | Siemensmeyer et al. |
| 11,899,167 B2 | 2/2024 | Nishio et al. |
| 11,926,720 B2 | 3/2024 | Nishio et al. |
| 11,934,226 B2 | 3/2024 | Nishio et al. |
| 11,939,499 B2 | 3/2024 | Nishio et al. |
| 11,997,916 B2 | 5/2024 | Nishio et al. |
| 2002/0034709 A1 | 3/2002 | Fukuda et al. |
| 2002/0036285 A1 | 3/2002 | Prechtl et al. |
| 2002/0146518 A1 | 10/2002 | Kusume et al. |
| 2002/0167111 A1 | 11/2002 | Tsunekawa et al. |
| 2003/0072893 A1 | 4/2003 | Nakano et al. |
| 2004/0028925 A1 | 2/2004 | Kusume et al. |
| 2004/0037978 A1 | 2/2004 | Tsubaki et al. |
| 2004/0075080 A1 | 4/2004 | Prechtl et al. |
| 2004/0212767 A1 | 10/2004 | Sasaki et al. |
| 2005/0099562 A1 | 5/2005 | Nishikouji et al. |
| 2006/0077320 A1 | 4/2006 | Hata et al. |
| 2006/0210709 A1 | 9/2006 | Shutou |
| 2006/0227439 A1 | 10/2006 | Taki et al. |
| 2008/0193747 A1 | 8/2008 | MacDonald et al. |
| 2008/0233312 A1 | 9/2008 | Nakamura et al. |
| 2009/0068472 A1 | 3/2009 | Umemoto et al. |
| 2009/0137761 A1 | 5/2009 | Irisawa et al. |
| 2009/0247782 A1 | 10/2009 | Irisawa et al. |
| 2009/0269513 A1 | 10/2009 | Nishiyama et al. |
| 2009/0275742 A1 | 11/2009 | Sano et al. |
| 2011/0315306 A1 | 12/2011 | Goto et al. |
| 2012/0052197 A1 | 3/2012 | Sawada et al. |
| 2012/0055607 A1 | 3/2012 | Kitagawa et al. |
| 2012/0055608 A1 | 3/2012 | Kitagawa et al. |
| 2012/0055621 A1 | 3/2012 | Goto et al. |
| 2012/0055622 A1 | 3/2012 | Kitagawa et al. |
| 2012/0055623 A1 | 3/2012 | Kitagawa et al. |
| 2012/0056211 A1 | 3/2012 | Kitagawa et al. |
| 2012/0056340 A1 | 3/2012 | Kitagawa et al. |
| 2012/0057104 A1 | 3/2012 | Kitagawa et al. |
| 2012/0057107 A1 | 3/2012 | Kitagawa et al. |

(Continued)

FOREIGN PATENT DOCUMENTS

| CN | 1760703 A | 4/2006 |
|---|---|---|
| CN | 1839176 A | 9/2006 |

(Continued)

OTHER PUBLICATIONS

Japanese Patent Office, International Search Report in International Patent Application No. PCT/JP2020/025671 (Sep. 15, 2020).

(Continued)

*Primary Examiner* — Sheeba Ahmed
(74) *Attorney, Agent, or Firm* — Leydig, Voit & Mayer, Ltd.

(57) ABSTRACT

Provided is a hard coating film for foldable displays that does not form creases or cracks in the folding portion, and that is also excellent in reducing iridescent colors (interference mottling) caused by fine cracks in an easy-to-adhere resin layer or other layers. The hard coating film for foldable displays contains a polyester film having a thickness of 10 to 80 μm, an easy-to-adhere resin layer, and a hard coating layer, the easy-to-adhere resin layer and the hard coating layer being stacked in this order on at least one surface of the polyester film, wherein the easy-to-adhere resin layer is a cured product of a composition containing at least one compound selected from the group consisting of titanium compounds and zirconium compounds and a polyester resin, and the polyester film having the easy-to-adhere resin layer stacked thereon but not yet having the hard coating layer stacked thereon satisfies characteristics within specific ranges.

7 Claims, 1 Drawing Sheet

(56) References Cited

U.S. PATENT DOCUMENTS

| | | |
|---|---|---|
| 2012/0057231 A1 | 3/2012 | Goto et al. |
| 2012/0057232 A1 | 3/2012 | Goto et al. |
| 2012/0058291 A1 | 3/2012 | Kitagawa et al. |
| 2012/0058321 A1 | 3/2012 | Goto et al. |
| 2012/0107605 A1 | 5/2012 | Ozawa et al. |
| 2012/0229732 A1 | 9/2012 | Koike et al. |
| 2012/0327512 A1 | 12/2012 | Goto et al. |
| 2013/0088859 A1 | 4/2013 | Wang |
| 2013/0100529 A1 | 4/2013 | Kitagawa et al. |
| 2013/0114139 A1 | 5/2013 | Kitagawa et al. |
| 2014/0016198 A1 | 1/2014 | Sawada et al. |
| 2014/0044947 A1 | 2/2014 | Sawada et al. |
| 2014/0104519 A1 | 4/2014 | Murata et al. |
| 2014/0186568 A1 | 7/2014 | Kitagawa et al. |
| 2015/0183199 A1 | 7/2015 | Kitagawa et al. |
| 2015/0369981 A1 | 12/2015 | Takeda et al. |
| 2016/0025910 A1 | 1/2016 | Sawada et al. |
| 2016/0035801 A1 | 2/2016 | Kim |
| 2016/0054494 A1 | 2/2016 | Kitagawa et al. |
| 2016/0062012 A1 | 3/2016 | Shin et al. |
| 2016/0103249 A1 | 4/2016 | Sato et al. |
| 2016/0103258 A1 | 4/2016 | Kitagawa et al. |
| 2016/0318845 A1 | 11/2016 | Katoh et al. |
| 2017/0131445 A1 | 5/2017 | Koyama |
| 2017/0276840 A1 | 9/2017 | Horio et al. |
| 2018/0088392 A1 | 3/2018 | Park et al. |
| 2018/0095211 A1 | 4/2018 | Lee et al. |
| 2018/0179395 A1 | 6/2018 | Seo et al. |
| 2018/0217639 A1 | 8/2018 | Jones et al. |
| 2018/0356564 A1 | 12/2018 | Jeong et al. |
| 2019/0004367 A1 | 1/2019 | Koike et al. |
| 2019/0177577 A1 | 6/2019 | Yamasaki et al. |
| 2019/0219740 A1 | 7/2019 | Horio et al. |
| 2019/0255807 A1 | 8/2019 | Isojima et al. |
| 2020/0142116 A1 | 5/2020 | Lee et al. |
| 2020/0269559 A1 | 8/2020 | Inagaki et al. |
| 2020/0292739 A1 | 9/2020 | Tomohisa et al. |
| 2020/0353734 A1 | 11/2020 | Kim et al. |
| 2021/0041603 A1 | 2/2021 | Kanke et al. |
| 2021/0132663 A1 | 5/2021 | Hongo et al. |
| 2021/0179794 A1 | 6/2021 | Yoshino et al. |
| 2021/0179901 A1 | 6/2021 | Fujita et al. |
| 2022/0085307 A1 | 3/2022 | Nishio et al. |
| 2022/0164003 A1 | 5/2022 | Nishio et al. |
| 2022/0213350 A1 | 7/2022 | Nishio et al. |
| 2022/0214486 A1 | 7/2022 | Isojima et al. |
| 2022/0227950 A1 | 7/2022 | Nishio et al. |
| 2022/0236467 A1 | 7/2022 | Nishio et al. |
| 2022/0236468 A1 | 7/2022 | Nishio et al. |
| 2022/0246069 A1 | 8/2022 | Nishio et al. |
| 2022/0252763 A1 | 8/2022 | Nishio et al. |
| 2022/0275159 A1 | 9/2022 | Yamaguchi et al. |
| 2023/0122628 A1 | 4/2023 | Matsumura et al. |
| 2023/0192974 A1 | 6/2023 | Nishio et al. |
| 2024/0276862 A1 | 8/2024 | Nishio et al. |

FOREIGN PATENT DOCUMENTS

| | | |
|---|---|---|
| CN | 1967294 A | 5/2007 |
| CN | 101160674 A | 4/2008 |
| CN | 101923245 A | 12/2010 |
| CN | 104067352 A | 9/2014 |
| CN | 104159735 A | 11/2014 |
| CN | 105321978 A | 2/2016 |
| CN | 106488839 A | 3/2017 |
| CN | 107867030 A | 4/2018 |
| CN | 108349228 A | 7/2018 |
| CN | 109789691 A | 5/2019 |
| EP | 0112488 A1 | 7/1984 |
| EP | 3922668 A1 | 12/2021 |
| EP | 3923263 A1 | 12/2021 |
| EP | 3978554 A1 | 4/2022 |
| EP | 3978966 A1 | 4/2022 |
| EP | 4119599 A1 | 1/2023 |
| JP | S60-097323 A | 5/1985 |
| JP | S60-203422 A | 10/1985 |
| JP | S61-009619 A | 1/1986 |
| JP | S63-001357 B2 | 1/1988 |
| JP | S63-301850 A | 12/1988 |
| JP | H05-049710 B2 | 7/1993 |
| JP | H10-316783 A | 12/1998 |
| JP | H11-513360 A | 11/1999 |
| JP | 2000-063538 A | 2/2000 |
| JP | 2000-177001 A | 6/2000 |
| JP | 2001-324603 A | 11/2001 |
| JP | 2001-350021 A | 12/2001 |
| JP | 2002-030042 A | 1/2002 |
| JP | 2002-178400 A | 6/2002 |
| JP | 2002-229039 A | 8/2002 |
| JP | 2002-265541 A | 9/2002 |
| JP | 2002-303722 A | 10/2002 |
| JP | 2002-308832 A | 10/2002 |
| JP | 2002-317013 A | 10/2002 |
| JP | 2003-089151 A | 3/2003 |
| JP | 2003-520878 A | 7/2003 |
| JP | 2004-204160 A | 7/2004 |
| JP | 2004-529220 A | 9/2004 |
| JP | 2004-299101 A | 10/2004 |
| JP | 2005-154566 A | 6/2005 |
| JP | 2005-263789 A | 9/2005 |
| JP | 2005-331909 A | 12/2005 |
| JP | 2006-187880 A | 7/2006 |
| JP | 2006-285197 A | 10/2006 |
| JP | 2007-016207 A | 1/2007 |
| JP | 2007-076839 A | 3/2007 |
| JP | 2007-094071 A | 4/2007 |
| JP | 2007-510946 A | 4/2007 |
| JP | 2007-119415 A | 5/2007 |
| JP | 2007-121721 A | 5/2007 |
| JP | 2007-126628 A | 5/2007 |
| JP | 2007-133184 A | 5/2007 |
| JP | 2007-138138 A | 6/2007 |
| JP | 2007-140465 A | 6/2007 |
| JP | 2007-156439 A | 6/2007 |
| JP | 2007-186430 A | 7/2007 |
| JP | 2008-070708 A | 3/2008 |
| JP | 2008-149577 A | 7/2008 |
| JP | 2008-242231 A | 10/2008 |
| JP | 2009-093074 A | 4/2009 |
| JP | 2009-109831 A | 5/2009 |
| JP | 2009-149066 A | 7/2009 |
| JP | 2009-199087 A | 9/2009 |
| JP | 2010-168570 A | 8/2010 |
| JP | 2010-228391 A | 10/2010 |
| JP | 2011-002816 A | 1/2011 |
| JP | 2011-154134 A | 8/2011 |
| JP | 2012-073563 A | 4/2012 |
| JP | 2012-107080 A | 6/2012 |
| JP | 2012-214726 A | 11/2012 |
| JP | 2013-033248 A | 2/2013 |
| JP | 2013-052561 A | 3/2013 |
| JP | 2013-101328 A | 5/2013 |
| JP | 2013-114131 A | 6/2013 |
| JP | 2013-184431 A | 9/2013 |
| JP | 2013-210624 A | 10/2013 |
| JP | 2014-065887 A | 4/2014 |
| JP | 2014-186210 A | 10/2014 |
| JP | 2014-206682 A | 10/2014 |
| JP | 2014-221560 A | 11/2014 |
| JP | 2015-007702 A | 1/2015 |
| JP | 2015-030157 A | 2/2015 |
| JP | 2015-064418 A | 4/2015 |
| JP | 2015-129210 A | 7/2015 |
| JP | 2015-163596 A | 9/2015 |
| JP | 2015-174357 A | 10/2015 |
| JP | 2015-184664 A | 10/2015 |
| JP | 2015-232120 A | 12/2015 |
| JP | 2016-004055 A | 1/2016 |
| JP | 2016-075869 A | 5/2016 |
| JP | 2016-090925 A | 5/2016 |
| JP | 2016-155124 A | 9/2016 |
| JP | 2017-033033 A | 2/2017 |
| JP | 2017-033034 A | 2/2017 |
| JP | 2017-067819 A | 4/2017 |

(56) References Cited

FOREIGN PATENT DOCUMENTS

| | | | |
|---|---|---|---|
| JP | 2017-134416 A | 8/2017 | |
| JP | 2018-010086 A | 1/2018 | |
| JP | 2018-022060 A | 2/2018 | |
| JP | 2018-027995 A | 2/2018 | |
| JP | 2018-059070 A | 4/2018 | |
| JP | 6307205 B1 | 4/2018 | |
| JP | 2018-072663 A | 5/2018 | |
| JP | 2018-124367 A | 8/2018 | |
| JP | 2018-202696 A | 12/2018 | |
| JP | 2018-538572 A | 12/2018 | |
| JP | 2019-008026 A | 1/2019 | |
| JP | 2019-082648 A | 5/2019 | |
| KR | 10-2000-0023039 A | 4/2000 | |
| KR | 10-2002-0029377 A | 4/2002 | |
| TW | 201733807 A | 10/2017 | |
| TW | 201839476 A | 11/2018 | |
| WO | WO 2001/053384 A1 | 7/2001 | |
| WO | WO 2002/062873 A1 | 8/2002 | |
| WO | WO 2005/045485 A1 | 5/2005 | |
| WO | WO 2006/100830 A1 | 9/2006 | |
| WO | WO 2010/100917 A1 | 9/2010 | |
| WO | WO 2011/058774 A1 | 5/2011 | |
| WO | WO 2012/121042 A1 | 9/2012 | |
| WO | WO 2013/100042 A1 | 7/2013 | |
| WO | WO 2014/203894 A1 | 12/2014 | |
| WO | WO 2016/010134 A1 | 1/2016 | |
| WO | WO 2017/115736 A1 | 7/2017 | |
| WO | WO 2017/200042 A1 | 11/2017 | |
| WO | WO 2018/003963 A1 | 1/2018 | |
| WO | WO 2018/070132 A1 | 4/2018 | |
| WO | WO 2018/150940 A1 | 8/2018 | |
| WO | WO 2018/159285 A1 | 9/2018 | |
| WO | WO 2019/026753 A1 | 2/2019 | |
| WO | WO 2019/202992 A1 | 10/2019 | |
| WO | WO 2019/216172 A1 | 11/2019 | |
| WO | WO 2020/162119 A1 | 8/2020 | |
| WO | WO 2020/162120 A1 | 8/2020 | |
| WO | WO 2020/241278 A1 | 12/2020 | |
| WO | WO 2020/241279 A1 | 12/2020 | |
| WO | WO 2020/241280 A1 | 12/2020 | |
| WO | WO 2020/241281 A1 | 12/2020 | |
| WO | WO 2020/241312 A1 | 12/2020 | |
| WO | WO 2020/241313 A1 | 12/2020 | |
| WO | WO 2021/010159 A1 | 1/2021 | |

OTHER PUBLICATIONS

Japanese Patent Office, International Search Report in International Patent Application No. PCT/JP2020/025672 (Sep. 15, 2020).
European Patent Office, Extended European Search Report in European Patent Application No. 20840513.4 (Jul. 3, 2023).
European Patent Office, Extended European Search Report in European Patent Application No. 20840729.6 (Jul. 3, 2023).
Korean Intellectual Patent Office, Office Action in Korean Patent Application No. 10-2021-7042274 (Sep. 10, 2024).
Korean Intellectual Patent Office, Office Action in Korean Patent Application No. 10-2021-7042276 (Sep. 10, 2024).
Lub et al., "The synthesis of liquid-crystalline diacrylates derived from cyclohexane units," *Recl. Trav. Chim. Pays-Bas*, 115(6): 321-328 (1996).
Yang, "Review of Operating Principle and Performance of Polarizer-Free Reflective Liquid-Crystal Displays," *Journal of the Society for Information Display*, 16:1 (2012).
Wikipedia, "Cyclic Olefin Copolymer" (2023) [accessed at https://en.wikipedia.org/wiki/Cyclic_olefin_copolymer].
European Patent Office, Extended European Search Report in European Patent Application No. 20752680.7 (Oct. 26, 2022).
European Patent Office, Extended European Search Report in European Patent Application No. 20753154.2 (Oct. 10, 2022).
European Patent Office, Extended European Search Report in European Patent Application No. 20814476.6 (Jun. 12, 2023).
European Patent Office, Extended European Search Report in European Patent Application No. 20815401.3 (Jun. 12, 2023).
European Patent Office, Extended European Search Report in European Patent Application No. 20815504.4 (May 15, 2023).
European Patent Office, Extended European Search Report in European Patent Application No. 20815576.2 (May 9, 2023).
Japan Patent Office, International Search Report in International Patent Application No. PCT/JP2020/001043 (Mar. 24, 2020).
Japan Patent Office, International Search Report in International Patent Application No. PCT/JP2020/001044 (Mar. 17, 2020).
Japan Patent Office, International Search Report in International Patent Application No. PCT/JP2020/019264 (Jul. 21, 2020).
Japan Patent Office, International Search Report in International Patent Application No. PCT/JP2020/019265 (Jul. 21, 2020).
Japan Patent Office, International Search Report in International Patent Application No. PCT/JP2020/019266 (Jul. 28, 2020).
Japan Patent Office, International Search Report in International Patent Application No. PCT/JP2020/019267 (Jul. 21, 2020).
Japan Patent Office, International Search Report in International Patent Application No. PCT/JP2020/019484 (Jul. 28, 2020).
Japan Patent Office, International Search Report in International Patent Application No. PCT/JP2020/019485 (Jul. 14, 2020).
Japan Patent Office, Office Action in Japanese Patent Application No. 2020-086715 (Oct. 17, 2023).
Korean Intellectual Property Office, Office Action in Korean Patent Application No. 10-2022-7003303 (Sep. 20, 2024).
Korean Intellectual Property Office, Office Action in Korean Patent Application No. 10-2022-7003304 (Sep. 25, 2024).
U.S. Appl. No. 17/429,119, filed Aug. 6, 2021.
U.S. Appl. No. 17/429,147, filed Aug. 6, 2021.
U.S. Appl. No. 17/614,154, filed Nov. 24, 2021.
U.S. Appl. No. 17/614,201, filed Nov. 24, 2021.
U.S. Appl. No. 17/614,228, filed Nov. 24, 2021.
U.S. Appl. No. 17/614,260, filed Nov. 24, 2021.
U.S. Appl. No. 17/615,426, filed Nov. 30, 2021.
U.S. Appl. No. 17/615,433, filed Nov. 30, 2021.
U.S. Appl. No. 17/625,302, filed Jan. 6, 2022.
U.S. Appl. No. 18/643,154, filed Apr. 23, 2024.

HARD COAT FILM FOR FOLDABLE DISPLAY AND USE THEREOF

TECHNICAL FIELD

The present invention relates to hard coating films for foldable displays, foldable displays, and mobile devices. The present invention relates to foldable displays and mobile devices that are unlikely to have image distortion caused by deformation of the films even when they are repeatedly folded, and relates to hard coating films for the foldable displays.

BACKGROUND ART

As they have become thinner and lighter, mobile devices such as smart phones have become widely prevalent. While required to have a variety of functions, mobile devices are also required to be convenient to use. It is taken for granted that prevailing mobile devices can be operated with one hand for simple tasks, and can be put into a clothes pocket. Thus, such mobile devices must have a small screen size, such as about 6 inches.

Tablet devices with a screen size of 7 to 10 inches are intended for use not only for video content and music, but also for business purposes, drawing, and reading, and thus have a high level of functionality. However, these devices cannot be operated with one hand and are not particularly portable, leaving some issues in regards to convenience.

In order to meet the above requirements, PTL 1 suggests a technique of making compact devices by connecting multiple displays. However, due to the remaining bezel portion, the image is split, and visibility decreases. Thus, this technique is not commonly used.

More recently, mobile devices equipped with a flexible or foldable display have been suggested. This technique enables a mobile device equipped with a large screen display to be conveniently carried without problems of image-splitting.

Conventional displays and mobile devices that have no folding structure can be protected by a non-flexible material, such as glass, that is applied to the surface of the display. However, a foldable display that uses a single screen spanning over a folding portion must be protected by, for example, a flexible and surface-protecting hard coating film. However, a foldable display is repeatedly folded at the point where a portion folds, and the film at that point deforms over time, causing image distortion on the display. In addition to the surface protection film, films are further used in various parts of a foldable display, such as a polarizing plate, a retardation film, a touchscreen substrate, a substrate of display cells such as organic EL, and protective materials on the back. These films are also required to be durable against repeated folding.

PTL 2 suggests a technique of partially altering the film thickness in order to increase durability. However, this method is not suitable for mass production.

A technique to adjust the refractive index of a polyester film in the bending direction is also suggested (see PTL 3). However, the pencil hardness during the application of hard coating decreases with a decrease in the refractive index in the bending direction, thus lowering the surface protection functionality of the display. Additionally, while decreasing the refractive index in one direction reduces deformation that occurs when the display is folded, it makes the folding direction more uniaxially oriented, forming cracks or breaking the display at the folding portion.

The hard coating film is required to have visibility and design characteristics. To suppress the glare and iridescent colors (interference spots) caused by reflected light when viewed from a given angle, it is common practice to provide a multilayered anti-reflective layer composed of a high-refractive-index layer and a low-refractive-index layer alternately stacked on top of the hard coating layer. However, three-wavelength fluorescent lamps have recently become mainstream for reproducing daylight color, and this makes interference mottling caused by reflected light more noticeable. There is also a growing demand for cost reduction by simplifying the anti-reflective layer. Thus, there is a need for a hard coating film that can reduce interference mottling as much as possible with no anti-reflective layer added.

Although a method of providing one or two refractive-index-adjusted optical adjustment layers on a polyester film has been proposed to reduce interference mottling as described above, the durability of polyester films against repeated folding must be taken into account. For example, an optical adjustment layer containing an excess of fine metal particles is not fully satisfactory due to interference mottling caused by fine cracks originating from the particles.

CITATION LIST

Patent Literature

PTL 1: JP2010-228391A
PTL 2: JP2016-155124A
PTL 3: WO2018/150940A

SUMMARY OF INVENTION

Technical Problem

The present invention is intended to solve the problems that arise in conventional parts of displays as described above. The invention is intended to provide a hard coating film for foldable displays that do not form creases or cracks in the folding portion, and that can further effectively reduce iridescent colors (interference mottling) caused by fine cracks in an easy-to-adhere resin layer in order to provide a foldable display that is suitable for mass production and that is unlikely to have distortion of images on the folding portion after the display is repeatedly folded; and to provide a mobile device equipped with such a foldable display.

Solution to Problem

Specifically, the present invention includes the following subject matter.
1. A hard coating film for a foldable display, the hard coating film comprising
    a polyester film having a thickness of 10 to 80 μm,
    an easy-to-adhere resin layer, and
    a hard coating layer, the easy-to-adhere resin layer and the hard coating layer being stacked in this order on at least one surface of the polyester film,
    wherein
    the easy-to-adhere resin layer is a cured product of a composition containing
        at least one compound selected from the group consisting of titanium compounds and zirconium compounds, and a polyester resin, and the polyester film having the easy-to-adhere resin layer stacked thereon but not yet having the hard coating layer stacked thereon satisfies the following conditions (1) to (4):

(1) the polyester film has a refractive index in the bending direction of 1.590 to 1.620,
(2) the polyester film has a refractive index in the direction of a folding portion of 1.670 to 1.700,
(3) the polyester film has a refractive index in the thickness direction of 1.520 or less, and
(4) the polyester film has a density of 1.380 g/cm$^3$ or more, wherein the bending direction refers to a direction orthogonal to the folding portion of the polyester film to be folded.

2. The hard coating film for a foldable display according to Item 1, wherein the easy-to-adhere resin layer has a refractive index lower than the refractive index in the bending direction and the refractive index in the direction of the folding portion of the polyester film having the easy-to-adhere resin layer stacked thereon but not yet having the hard coating layer stacked thereon, and the easy-to-adhere resin layer has a refractive index higher than the refractive index of the hard coating layer.

3. The hard coating film for a foldable display according to Item 1 or 2, wherein the easy-to-adhere resin layer has a refractive index that satisfies the following conditions (5) and (6):

(5) the easy-to-adhere resin layer has a refractive index lower than the refractive index in the bending direction of the polyester film having the easy-to-adhere resin layer stacked thereon but not yet having the hard coating layer stacked thereon, and the difference in refractive index is more than 0 and 0.07 or less, and
(6) the easy-to-adhere resin layer has a refractive index lower than the refractive index in the direction of the folding portion of the polyester film having the easy-to-adhere resin layer stacked thereon but not yet having the hard coating layer stacked thereon, and the difference in refractive index is 0.080 or more and 0.150 or less.

4. The hard coating film for a foldable display according to any one of Items 1 to 3, wherein the polyester resin, which is formed from a dicarboxylic acid component and a diol component, present in the easy-to-adhere resin layer contains a naphthalene dicarboxylic acid component as at least part of the dicarboxylic acid component.

5. The hard coating film for a foldable display according to any one of Items 1 to 4, wherein the polyester film having the easy-to-adhere resin layer stacked thereon but not yet having the hard coating layer stacked thereon has a total light transmittance of 85% or more, a haze of 3% or less, and a maximum heat shrinkage of 6% or less.

6. The hard coating film for a foldable display according to any one of Items 1 to 5, wherein the hard coating layer has a thickness of 1 to 50 μm.

7. A foldable display comprising the hard coating film for a foldable display of Item 6,
wherein
the hard coating film is disposed as a surface protection film such that the hard coating layer becomes the front surface, and
the hard coating film is a single continuous film placed through the folding portion of the foldable display.

8. A mobile device comprising the foldable display of Item 7.

Advantageous Effects of Invention

While a foldable display using the hard coating film for foldable displays according to the present invention maintains its suitability in mass production, the hard coating film is unlikely to have cracks at the folding portion and deform after being repeatedly folded. Additionally, the foldable display effectively reduces cracks in the folding portion, lifting at the interface between a hard coating and an easy-to-adhere resin layer, lifting at the interface between an easy-to-adhere resin layer and a polyester film, or iridescent colors (interference mottling) caused by fine cracks, and does not cause distortion of image in the display at the folding portion. A mobile device equipped with the above foldable display using the hard coating film provides beautiful images and has a variety of functions, while being highly convenient such as in terms of portability.

DESCRIPTION OF EMBODIMENTS

Display

Figure 1:
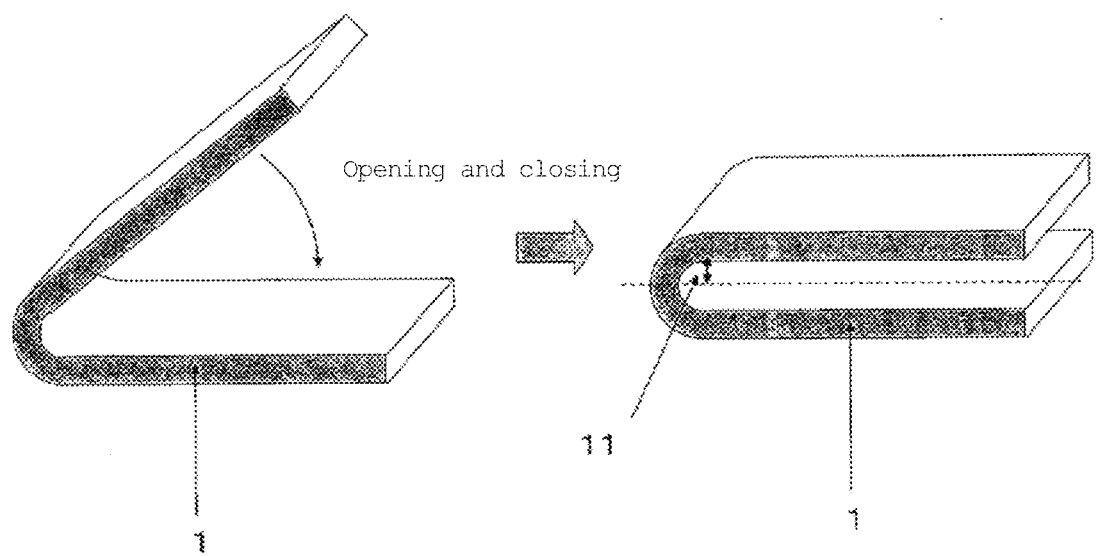
FIG. 1 is a schematic diagram showing the bend radius of the foldable display according to the present invention being folded.

The term "display" as used in the present invention refers to display devices in general. There are several types of displays such as LCDs, organic EL displays, inorganic EL displays, LEDs, and FEDs; however, LCDs, organic ELs, and inorganic ELs, which have a foldable structure, are preferable. In particular, organic EL displays and inorganic EL displays, which can reduce the layer structure, are preferable; and organic EL displays, which have a wide color gamut, are even more preferable.

Foldable Display

A foldable display is a single continuous display that can be folded in half or other ways when carried. The size of the fordable display can be reduced by half or even more by folding it, and thus the portability is improved. The foldable display preferably has a bend radius of 5 mm or less, and more preferably 3 mm or less. A bend radius of 5 mm or less enables the foldable display to be thin when folded. A smaller bend radius is better; however, the smaller the bend radius, the more easily creases form. The bend radius is preferably 0.1 mm or more, or can even be 0.5 mm or more or 1 mm or more. Even a bend radius of 1 mm can achieve a reduction in thickness sufficient for practical use in carrying the display. The bend radius of a folded display refers to a value measured at the point indicated by numerical reference 11 in the schematic diagram of FIG. 1, and is the inner radius of the folding portion of the display being folded. The surface protection film, described later, may be positioned on the outer side or inner side of the foldable display being folded.

The foldable display may be a three-fold or four-fold display, or a rollable display, which is a retractable display. All of these displays fall within the scope of the foldable display according to the present invention.

The hard coating film for a foldable display according to the present invention may be used in any part of the components of a foldable display. The following describes a typical structure of a foldable display and the parts in which the hard coating film according to the present invention is usable, taking an organic EL display as an example. The hard coating film for a foldable display according to the present invention may be simply referred to below as "the hard coating film according to the present invention."

Foldable Organic EL Display

The essential component of a foldable organic EL display is an organic EL module. A foldable organic EL display may further optionally include, for example, a circularly polarizing plate, a touchscreen module, a surface protection film, and a back protection film.

Organic EL Module

A typical structure of an organic EL module includes an electrode, an electron transport layer, a light-emitting layer, a hole transport layer, and a transparent electrode.

Touchscreen Module

The mobile device preferably includes a touchscreen. An organic EL display for use preferably includes a touchscreen module on the organic EL display or between the organic EL module and the circularly polarizing plate. The touchscreen module includes a transparent substrate such as a film and a transparent electrode provided on the transparent substrate. The hard coating film of the present invention is usable as this transparent substrate. The film for use as a transparent substrate for touchscreens is preferably provided with a refractive index adjustment layer.

Circularly Polarizing Plate

The circularly polarizing plate suppresses the deterioration of image quality due to the reflection of external light by the components inside the display. A circularly polarizing plate includes a linear polarization plate and a retardation film. The linear polarization plate includes a protection film at least on the visible side of the polarizer. A protection film may be provided on the side opposite the visible side of the polarizer, and a retardation film may be directly stacked on the polarizer. The retardation film for use is a resin film with a phase difference such as polycarbonate or cyclic-olefin, or such a resin film provided with a retardation layer formed of a liquid crystal compound. The hard coating film of the present invention is also usable as a protection film for polarizers. In these cases, when the substrate film of the hard coating film according to the present invention is a polyester film, the slow axis direction of the polyester film is preferably parallel or orthogonal to the absorption axis direction of the polarizer. A deviation of up to 10 degrees, preferably 5 degrees, from this parallel or orthogonal relationship is permissible.

Surface Protection Film

Because a shock applied to a display from above may break the circuitry of an organic EL module or a touchscreen module, a surface protection film is provided in most cases. The hard coating film according to the present invention is used as this surface protection film. The surface protection film includes a "cover window," which is incorporated into the top surface of the display, and an "after film," which can be attached, peeled off, and replaced with another by the user. The hard coating film is usable in either case. The hard coating film is provided on the front surface of a foldable display with the hard coating layer on the viewing side. The hard coating layer may be provided on both surfaces of the polyester film.

Back Protection Film

A protection film is also preferably provided on the back of the display. The hard coating film according to the present invention can be used as the protection film for the back.

The hard coating film according to the present invention can be any film that is usable in the components of a foldable display at the folded portion, in addition to those described above. Among these, the hard coating film according to the present invention is preferably used in cover window surface protection films, after-surface protection films, substrate films for touchscreen modules, or back protection films. The hard coating film according to the present invention is more preferably used in cover window surface protection films, or after-surface protection films.

In a foldable display, the hard coating film according to the present invention does not have to be used in all of the uses described above. In a foldable display, hard coating films that use a substrate of any of the following films are also usable according to suitability: a polyester film, a polyimide film, a polyamide film, a polyamide-imide film, a polycarbonate film, an acrylic film, a triacetyl cellulose film, a cyclo-olefin polymer film, a polyphenylene sulfide film, and a polymethylpentene film.

When the substrate film of the hard coating film according to the present invention is a polyester film, the polyester film may be a monolayered film composed of one or more types of polyester resins. If two or more types of polyester are used, the polyester film may be a multilayered film or ultra-multilayered lamination film with a repeating structure.

Examples of polyester resins for use in the polyester film, which is a substrate film of the hard coating film, include polyethylene terephthalate, polybutylene terephthalate, polyethylene-2,6-naphthalate, and polyester films composed of copolymers that contain the component of these resins as the main component. In particular, from the standpoint of mechanical properties, heat resistance, transparency, and price, drawn polyethylene terephthalate films are particularly preferable.

When a polyester copolymer is used in the polyester film, which is a substrate film of the hard coating film, the dicarboxylic acid component of the polyester can be, for example, aliphatic dicarboxylic acids, such as adipic acid and sebacic acid; aromatic dicarboxylic acids, such as terephthalic acid, isophthalic acid, phthalic acid, and 2,6-naphthalene dicarboxylic acid; or multifunctional carboxylic acids, such as trimellitic acid and pyromellitic acid. The glycol component can be, for example, fatty acid glycols, such as ethylene glycol, diethylene glycol, 1,4-butanediol, propylene glycol, and neopentyl glycol; aromatic glycols, such as p-xylene glycol; alicyclic glycols, such as 1,4-cyclohexanedimethanol; or polyethylene glycols with an average molecular weight of 150 to 20,000. The mass ratio of the copolymer component of the copolymer is preferably less than 20 mass %. A mass ratio of less than 20 mass % is preferable because film strength, transparency, and heat resistance are retained.

In the production of the polyester film, which is a substrate film of the hard coating film, at least one type of resin pellet preferably has an intrinsic viscosity of 0.50 to 1.0 dl/g. An intrinsic viscosity of 0.50 dl/g or more is preferable because such an intrinsic viscosity increases the shock resistance of the obtained film, and thus makes it unlikely that the internal circuit of the display will be broken by an external shock. An intrinsic viscosity of 1.00 dl/g or less is preferable because it prevents filtration pressure of the molten fluid from becoming too high, thus making it easier to stably perform film production.

The polyester film, which is a substrate film of the hard coating film, preferably has a thickness of 10 to 80 μm, and more preferably 25 to 75 μm. A thickness of 10 μm or more provides a pencil hardness improvement effect and an impact resistance improvement effect. A thickness of 80 μm or less is advantageous in terms of weight reduction and provides excellent flexibility, processability, and handleability.

The surface of the hard coating film according to the present invention may be smooth or uneven. However, a decreased level of optical properties due to unevenness is not preferable, because the film is used for covering the surface of a display. The polyester film on which the easy-to-adhere resin layer is stacked but the hard coating layer is not yet stacked has a haze of preferably 3% or less, more preferably 2% or less, and most preferably 1% or less. A haze of 3% or less can improve the visibility of images. Although a lower haze is better, the lower limit of haze may be preferably 0.1% or more, or 0.3% or more, from the standpoint of stable production.

Given the purposes of reducing the haze as described above, the film surface should not be too uneven. However, to provide the film with moderate slipperiness for handleability, unevenness may be formed on the film surface by adding particles to the substrate polyester film, or by applying a particle-containing coating layer as an easy-to-adhere resin layer to the substrate polyester film during the film-forming process.

The method for adding particles to a substrate polyester film can be a known method. For example, particles can be added at any stage of polyester production and can be preferably added in the form of slurry prepared by dispersing the particles in, for example, ethylene glycol, in the esterification stage, after the completion of transesterification, or before the start of polycondensation to allow polycondensation to proceed. Alternatively, particles can be added by a method of blending slurry prepared by dispersing particles in ethylene glycol or water with a polyester material by using a kneading extruder equipped with a vent, or a method of blending dry particles with a polyester material by using a kneading extruder.

In particular, preferable is a method of homogeneously dispersing the aggregates of inorganic particles in a monomer solution, which is part of a polyester material, then filtering the dispersion, and adding the filtrate to the remainder of the polyester material before, during, or after esterification. Due to the low viscosity of the monomer solution, this method enables homogeneous dispersion of particles and high-precision filtration of the slurry in a simple manner, while ensuring excellent particle dispersibility and low likelihood of the formation of new aggregates when particles are added to the remainder of the polyester material. From this viewpoint, it is particularly preferable to add particles to the remainder of the polyester material at a low temperature before esterification.

Additionally, the number of protrusions on the surface of the film can be further reduced by a method of preparing a particle-containing polyester beforehand, and kneading the particle-containing polyester pellets with particle-free pellets to extrude pellets (master batch method).

The polyester film for use in the substrate may contain various additives to the extent that the total light transmission is maintained within the desired range. Examples of additives include an antistatic agent, a UV absorber, and a stabilizer.

The polyester film having the easy-to-adhere resin layer stacked thereon but not yet having the hard coating layer stacked thereon has a total light transmittance of preferably 85% or more, and more preferably 87% or more. A transmittance of 85% or more sufficiently ensures visibility. In order to increase the total light transmittance of the hard coating film, described later, the total light transmittance of the polyester film is preferably 85% or more. Although a higher total light transmittance of the polyester film is better, the total light transmittance is preferably 99% or less, or may be 97% or less, from the standpoint of stable production.

The polyester film having the easy-to-adhere resin layer stacked thereon but not yet having the hard coating layer stacked thereon has a maximum heat shrinkage of preferably 6% or less, and more preferably 5% or less after heat treatment at 150° C. for 30 minutes. A heat shrinkage of 6% or less can reduce flatness errors, such as curling or undulation, during HC processing. Although a lower maximum heat shrinkage is better, the maximum heat shrinkage is preferably −1% or more, and preferably 0% or more. A negative value means that the polyester film expanded after heating. A value of −1% or more is preferable because it leads to an excellent flat condition.

To impart sufficient pencil hardness to the hard coating film for a foldable display according to the present invention, the polyester film having the easy-to-adhere resin layer stacked thereon but not yet having the hard coating layer stacked thereon preferably has the following characteristics. In the case of conventional substrate polyester films, a hard coating film formed by laminating a hard coating layer on such a conventional polyester film shows a decrease in pencil hardness seemingly due to deformation of the film in the thickness direction in pencil hardness evaluation of the hard coating film. In the present invention, the polyester film having the easy-to-adhere resin layer stacked thereon but not yet having the hard coating layer stacked thereon preferably has an indentation depth in the thickness direction that falls within a specific range after a test force is unloaded with a dynamic ultra-micro hardness tester, described later. This is preferable because a high level of hardness can be achieved in the pencil hardness evaluation of the hard coating film containing the substrate polyester film described above. The polyester film having the easy-to-adhere resin layer stacked thereon but not yet having the hard coating layer stacked thereon has an indentation depth of preferably 1.5 μm or less, more preferably 1.4 μm or less, and still more preferably 1.3 μm or less in the thickness direction after a test force is unloaded. When the indentation depth is 1.5 μm or less after unloading a test force (the final amount of deformation under load), the hard coating film formed by laminating a hard coating layer becomes resistant to deformation in the thickness direction and shows a high level of pencil hardness in pencil hardness evaluation. A hard coating film with a high level of pencil hardness makes it unlikely that the display surface will have scratches and dents, increasing the display visibility. A lower indentation depth is better after unloading a test force; however, from the standpoint of stable production and saturation of the effects, the indentation depth is preferably 0.3 μm or more, and more preferably 0.5 μm or more.

In order to decrease the indentation depth after unloading a test force, it is effective to adjust the refractive index in the thickness direction of the polyester film having the easy-to-adhere resin layer stacked thereon but not yet having the hard coating layer stacked thereon to 1.520 or less. The means to adjust the refractive index to 1.520 or less includes, for example, the following condition settings within the range in which other physical properties and the refractive index in the bending direction and in the folding direction can be regulated so as to fall within preferable ranges: adjusting the draw ratio in the bending direction or in the folding direction to a high value, setting a low draw temperature in the bending direction or in the folding direction, and setting a high heat fixation temperature. These are described later.

The non-hard coating surface of the hard coating film according to the present invention can be subjected to treatment for improving the adhesion with coating of a tackifier or with a hard coating layer.

Examples of surface treatment methods include unevenness-forming treatment by sandblasting, solvent treatment, etc.; and oxidation treatment such as corona discharge, electron beam irradiation, plasma treatment, ozone-UV irradiation, flame treatment, chromic-acid treatment, and hot-air treatment. These methods can be used without restriction.

Adhesion can also be preferably improved by an adhesiveness-improving layer, such as an easy-to-adhere resin layer. For the easy-to-adhere resin layer, resins such as acrylic resins, polyester resins, polyurethane resins, and polyether resins can be used without restriction. The easy-to-adhere resin layer can be formed by a typical coating technique, preferably "an in-line coating technique."

The polyester film described above can be produced, for example, by performing a polymerization step of homogenously dispersing inorganic particles in a monomer solution, which is part of a polyester material, filtering the dispersion, and adding the filtrate to the remainder of the polyester material to polymerize a polyester; and a film-forming step of melting and extruding the polyester into a sheet form through a filter, and cooling and drawing the sheet to form a substrate film.

Below, the method for producing a polyester film that serves as a substrate is described with an example in which pellets of polyethylene terephthalate ("PET" below) are used as a material of the substrate film. However, the method is not limited to this example. Additionally, the example is not intended to limit the number of layers such as a monolayer or a multilayer.

After a predetermined proportion of PET pellets is mixed and dried, the mixture is fed into a known extruder for melting and laminating, and then extruded from the slit die into a sheet form, followed by cooling and solidifying the sheet on a casting roll to form an unstretched film. A monolayer can be produced with a single extruder. A multilayered film (i.e., including two or more layers) can be produced by laminating multiple film layers that each constitute an outermost layer using two or more extruders, a multilayered manifold, or a confluence block (e.g., confluence blocks with a square joint), extruding a sheet of two or more layers from the outlet, and cooling the sheet on a casting roll to prepare an unstretched film.

In this case, it is preferable to perform high-precision filtration to remove foreign matter that may be present in the resin at any portion of the extruder at which the molten resin is maintained at about 280° C. during melt-extrusion. The filter material for use in high-precision filtration of a molten resin can be any material; however, a filter material made of sintered stainless steel is preferable because it is excellent in removing aggregates composed mainly of Si, Ti, Sb, Ge, or Cu and organic matter with a high melting point.

Additionally, the filter material has a filtered particle size (initial filtration efficiency: 95%) of preferably 20 μm or less, particularly preferably 15 μm or less. A filtered particle size (initial filtration efficiency: 95%) exceeding 20 μm may lead to insufficient removal of foreign matter with a size of 20 μm or more. Although high-precision filtration of molten resin using a filter material with a filtered particle size of 20 μm or less (initial filtration efficiency: 95%) may reduce productivity, such a filter material is preferable from the standpoint of obtaining a film that has fewer protrusions caused by coarse particles.

Refractive Index in Bending Direction

Figure 2:
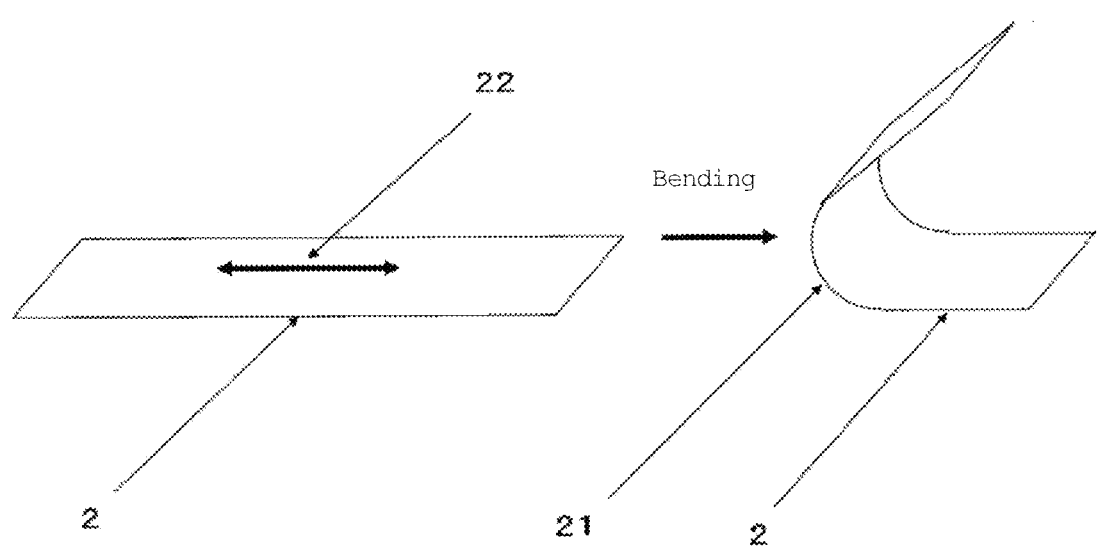
FIG. 2 is a schematic diagram showing the bending direction of the polyester film that constitutes the hard coating film for foldable displays according to the present invention.

In the present invention, the polyester film having the easy-to-adhere resin layer stacked thereon but not yet having the hard coating layer stacked thereon has a refractive index of preferably 1.590 to 1.620, and more preferably 1.591 to 1.600 at least either in the longitudinal direction (machine direction) or in the width direction. The polyester film having the easy-to-adhere resin layer stacked thereon but not yet having the hard coating layer stacked thereon has a refractive index of preferably 1.590 to 1.620, and more preferably 1.591 to 1.600 in the bending direction. The term "bending direction" as used here refers to a direction that is orthogonal to the folding portion (reference numeral 21) assumed in the use of a foldable display, as indicated by reference numeral 22 on a polyester film (reference numeral 2) shown in FIG. 2. A refractive index of 1.590 to 1.620 at least either in the longitudinal direction or in the width direction is preferable because such a refractive index minimizes the deformation caused by repeatedly folding the foldable display, and eliminates the risk of degrading image quality of the foldable display. The refractive index is more preferably 1.591 to 1.600. Of course, the direction of the refractive index is preferably the bending direction. A refractive index of 1.590 or more enables the display to maintain excellent visibility because it does not cause cracks in the direction of the folding portion after a bending test, described later, and of course, does not cause fracture. The refractive index of the polyester film can be effectively adjusted by adjusting the draw ratio and the draw temperature. Additionally, in order to adjust the refractive index, relaxing in the drawing direction or multi-stage drawing can be performed. In performing multi-stage drawing, it is preferable to set the draw ratio in the second and subsequent stages to a higher ratio than the draw ratio in the first stage. The difference in refractive index between the polyester film having the easy-to-adhere resin layer stacked thereon but not yet having the hard coating layer stacked thereon and the polyester film alone, which does not have even the easy-to-adhere resin layer, is so small that the difference can be ignored.

Fatigue due to compressive stress applied to the inner side of the display when the display is folded can be reduced by controlling the refractive index of the polyester film having the easy-to-adhere resin layer stacked thereon but not yet having the hard coating layer stacked thereon at least either in the longitudinal direction (machine direction) or in the width direction, more preferably the refractive index of the polyester film in the bending direction, so as to fall within the ranges above. Fatigue due to compressive stress is thought to occur mainly in the crystalline portions; fewer crystals in the bending direction causes less fatigue. Thus, lowering the refractive index is thought to reduce the amount of crystals oriented in the bending direction and reduce compressive fatigue.

Additionally, the creep phenomenon caused by tensile stress applied to the outer side of the folded display can be reduced by decreasing the refractive index. Fatigue due to tensile stress is thought to occur mainly in the amorphous portions; repeatedly applied stress causes the molecular chains to align, thus deforming the film. It is inferred that having fewer molecular chains aligned in the bending direction leads to less deformation caused by such an alignment of molecular chains. Because fatigue due to tension can be reduced by decreasing amorphous portions, higher crystallinity (i.e., density) is preferable.

In the present invention, the draw ratio of an unstretched polyester sheet either in the longitudinal direction (machine direction) or in the width direction is preferably 1.2- to 2.0-fold, and more preferably 1.7- to 2.0-fold. The draw direction is preferably the bending direction. A draw ratio of 1.2-fold or more is preferable due to there being no deformation during post-processing such as hard-coating application, while a draw ratio of 2.0-fold or less is preferable because the film thickness does not become uneven. The draw temperature is preferably 75 to 120° C., and more preferably 75 to 105° C. The heating method for use during drawing can be a known technique, such as a hot-air heating method, a roll heating method, or an infrared heating method. A draw temperature of 75 to 120° C. can prevent the film from having great unevenness in the thickness caused by drawing at a draw ratio within the range described above. Additionally, the refractive index in the thickness direction can be reduced by drawing the film at temperatures as low as possible within the above range in which the film does not have great unevenness in the thickness.

Refractive Index in the Direction of the Folding Portion

The refractive index of the polyester film having the easy-to-adhere resin layer stacked thereon but not yet having the hard coating layer stacked thereon in the direction orthogonal to the direction in which the refractive index is 1.590 to 1.620 is preferably 1.670 to 1.700. Specifically, the refractive index in the direction orthogonal to the bending direction (the direction of the folding portion) is preferably 1.670 to 1.700. A refractive index of 1.670 to 1.700 can reduce deformation that occurs when the film is folded in the bending direction. A refractive index of 1.700 or less can suppress the formation of cracks or fracture in the direction of the folding portion. A refractive index of 1.670 or more can increase flexibility in the bending direction and increase the surface hardness. A refractive index of 1.680 to 1.695 is more preferable. The refractive index in the direction orthogonal to the bending direction can be adjusted by, for example, the draw ratio, drawing preheating temperature, draw temperature, multi-stage drawing, and film relaxation. The draw ratio is preferably 4.0- to 6.0-fold, more preferably, 4.4- to 6.0-fold. The drawing preheating temperature in the direction orthogonal to the bending direction is preferably 70 to 110° C. In performing multi-stage drawing in the direction orthogonal to the bending direction, it is preferable to set the draw ratio in the second and subsequent states higher than the draw ratio in the first stage. Film relaxation may be performed by 1 to 10% either in the machine direction (longitudinal direction) or in the vertical direction (width direction), or both.

Refractive Index in the Thickness Direction

The polyester film having the easy-to-adhere resin layer stacked thereon but not yet having the hard coating layer stacked thereon has a refractive index of preferably 1.520 or less in the thickness direction. This is because a refractive index in the thickness direction of 1.520 or less can suppress the reduction in hardness of the film surface even when the refractive index in the bending direction is designed to be low, and can thus achieve both flexibility and surface hardness. A refractive index in the thickness direction of 1.520 or less can reduce the indentation depth in the thickness direction after unloading a test force and can increase the hardness of film surface, in particular the pencil hardness of a hard coating film formed by laminating a hard coating layer. The refractive index in the thickness direction is more preferably 1.515 or less, still more preferably 1.510 or less, particularly preferably 1.505 or less, and most preferably 1.500 or less. A lower refractive index in the thickness direction is preferable; however, from the standpoint of stable production, the refractive index in the thickness direction is preferably 1.3 or more, and may even be 1.4 or more. The refractive index in the thickness direction is particularly preferably 1.410 or more. The refractive index in the thickness direction within these ranges can be achieved by increasing the draw ratio in both the bending direction and the folding direction. In order to control the refractive index in the thickness direction after controlling the refractive index in the bending direction and in the width direction so as to fall within their preferable ranges, it is preferable to set the conditions while checking the balance of each process condition in the film-forming process.

The refractive index in the thickness direction can be controlled so as to fall within the above ranges by drawing preheating temperature, draw temperature, or draw ratio in the bending direction; or drawing preheating temperature, draw temperature, multi-stage drawing, high-ratio drawing, or temperature setting for heat fixation in the direction of the folding portion. The drawing preheating temperature in the bending direction is preferably 70 to 110° C. The draw temperature in the bending direction is preferably 75 to 120° C. The draw ratio in the bending direction is preferably 1.2- to 2.0-fold, and more preferably 1.7- to 2.0-fold. The refractive index in the thickness direction can be effectively reduced, while the flexibility in the bending direction is maintained, by performing drawing with a low draw ratio at a low draw temperature. The drawing preheating temperature in the direction of the folding portion is also preferably 75 to 110° C. The draw temperature is preferably 75 to 120° C. The draw ratio in the folding portion is preferably 4.0- to 6.0-fold, and more preferably 4.4- to 6.0-fold. The refractive index in the thickness direction can be effectively reduced while the refractive index in the bending direction is maintained or reduced. High-ratio drawing may be performed by multi-stage drawing. In this case, setting the draw ratio in the second stage higher than the draw ratio in the first stage is preferable because this enables effective control of the refractive index. The method of performing drawing again after a crystallization step can also be used. Accelerated drawing, in which the drawing rate is increased from the beginning toward the latter half of the drawing process, may be used.

The heat fixation temperature is preferably 180 to 240° C. Heat fixation facilitates crystallization oriented in the drawing direction and reduces the refractive index in the thickness direction. Although it is not necessarily clear why the hardness of film surface is increased by reducing the refractive index in the thickness direction, it is presumed that aromatic moieties such as benzene rings in the molecular chains are oriented in the plane direction, and this has the effect of suppressing deformation caused by stress applied in the thickness direction.

Density of Polyester Film

The polyester film having the easy-to-adhere resin layer stacked thereon but not yet having the hard coating layer stacked thereon has a density of preferably 1.380 g/cm$^3$ or more, and more preferably 1.383 g/cm$^3$ or more. A density of 1.380 g/cm$^3$ or more can increase flexibility and can increase the hardness of film surface, in particular the pencil hardness of a hard coating film formed by laminating a hard coating layer on the polyester film. A higher density is better. Although it somewhat depends on, for example, whether particles are present in the film, the density of the polyester film is preferably 1.40 g/cm³ or less. Setting the heat fixation temperature during film formation to 180 to 240° C. facilitates crystallization and thus effectively increases the density. The difference in density between the polyester film having the easy-to-adhere resin layer stacked thereon but not yet having the hard coating layer stacked thereon and the polyester film alone, which does not have even the easy-to-adhere resin layer, is so small that the difference can be ignored.

The bending direction of the polyester film is preferably the longitudinal direction (machine direction). This makes it easier to decrease the refractive index in the bending direction in the second stretching in biaxial stretching and increase flexibility. More specifically, a preferable polyester film can be obtained by drawing an unstretched polyester sheet in the longitudinal direction in a draw ratio of 1.2- to 2.0-fold, more preferably 1.7- to 2.0-fold. Additionally, in a preferable embodiment, the film is also drawn in the width direction in a draw ratio of 4.0- to 6.0-fold, more preferably 4.4- to 6.0-fold.

In a particularly preferable embodiment of the present invention, the polyester film having the easy-to-adhere resin layer stacked thereon but not yet having the hard coating layer stacked thereon satisfies the following four characteristics simultaneously:
(1) the polyester film has a refractive index in the bending direction of 1.590 to 1.620,
(2) the polyester film has a refractive index in the direction of a folding portion of 1.670 to 1.700,
(3) the polyester film has a refractive index in the thickness direction of 1.520 or less, and
(4) the polyester film has a density of 1.380 g/cm³ or more.

However, the resulting film may not satisfy the four characteristics simultaneously in the case of a combination of conditions that are not the best options within the individual preferable production conditions (e.g., a combination of a draw ratio in the bending direction of 1.4-fold or less, a draw ratio in the direction of the folding portion of less than 4.4-fold, and a heat fixation temperature of 220° C. or less), among the combinations within the scope of the preferable production conditions. In such a case, the four characteristics may be achieved simultaneously by fine-tuning some conditions or a combination of them, such as increasing the draw ratio in the bending direction to 1.7-fold or more, increasing the draw ratio in the direction of the folding portion to 4.4-fold or more, increasing the heat fixation temperature to about 230° C., and/or decreasing the draw temperature in the bending direction and/or the direction of the folding portion.

To adjust film formability, film strength, thermal dimensional stability, and poor appearance, any film-forming method such as drawing, relaxation, heat fixation, and surface treatment may be used. In a particularly preferable embodiment of the present invention, the refractive index and density of the film are controlled so as to fall within the preferable ranges above. Controlling the refractive index and density so as to fall within the preferable ranges above provides a polyester film that is suitable for foldable displays and that exhibits excellent flex resistance and surface hardness, in particular a high level of pencil hardness of a hard coating film formed by laminating a hard coating layer on the polyester film, as compared with conventional films.

Specifically, for example, after PET pellets are sufficiently dried in a vacuum, they are fed into an extruder, and then melted and extruded in a sheet form at about 280° C., followed by cooling and solidifying the sheet to form an unstretched PET sheet. The obtained unstretched sheet is drawn 1.2- to 2.0-fold, more preferably 1.7- to 2.0-fold in the longitudinal direction, with rolls heated to 75 to 120° C. to obtain a uniaxially oriented PET film. The film is then held with clips at its ends, and guided into a hot-air zone heated to 75 to 120° C., and dried, followed by drawing 4.0- to 6.0-fold, more preferably 4.4- to 6.0-fold in the width direction. Subsequently, the film is guided into a heat treatment zone at 180 to 240° C. and treated with heat for 1 to 60 seconds. During the heat treatment step, the film may optionally be subjected to relaxation treatment by 0 to 10% in the width or longitudinal direction.

The polyester film has an intrinsic viscosity of preferably 0.50 to 1.0 dl/g. An intrinsic viscosity of 0.50 dl/g or more is preferable because such an intrinsic viscosity increases the shock resistance of the film, and thus makes it unlikely that the internal circuitry of a display will become disconnected by an external shock. An intrinsic viscosity of 1.00 dl/g or less is preferable because it prevents the filtration pressure of the molten fluid from becoming too high, thus stabilizing film production.

Easy-to-Adhere Resin Layer

In the present invention, it is preferable to laminate an easy-to-adhere resin layer on the polyester film in order to improve the adhesiveness between the polyester film and the hard coating layer or other layers. The easy-to-adhere resin layer can be obtained by applying a coating solution for forming an easy-to-adhere resin layer to one or both surfaces of an unstretched or, longitudinally uniaxially oriented film, optionally performing heat treatment to dry the applied coating, and drawing the film in at least one direction in which the film is not stretched ("in-line coating"). Heat treatment can also be performed after biaxial drawing is performed. It is preferable to control the final amount of the applied easy-to-adhere layer to 0.005 to 0.20 g/m². An amount of the applied easy-to-adhere resin layer of 0.005 g/m² or more is preferable because it provides adhesiveness. An amount of the applied easy-to-adhere resin layer of 0.20 g/m² or less is preferable because it provides blocking resistance.

Examples of resins to be contained in the coating solution for use in laminating an easy-to-adhere layer include polyester resins, polyether-polyurethane resins, polyester polyurethane resins, polycarbonate polyurethane resins, and acrylic resin; although these resins can be used without any particular limitation, the coating solution preferably contains a polyester resin from the standpoint of a high level of adhesion with the polyester film or its refractive index. Additionally, the polyester resin is preferably a copolymerized polyester resin that contains a naphthalene dicarboxylic acid component, which can increase the refractive index of the easy-to-adhere resin layer, with the naphthalene dicarboxylic acid component contained as at least part of a dicarboxylic acid component, which constitutes the polyester resin together with a diol component. To increase the adhesion durability of the easy-to-adhere resin layer, the binder resin contained in the easy-to-adhere resin layer may form a crosslinking structure. Examples of crosslinking agents to be contained in the coating solution for forming an easy-to-adhere-layer include melamine compounds, isocyanate compounds, oxazoline compounds, epoxy compounds, and carbodiimide compounds. Self-crosslinking polyurethane resins may also be added. These crosslinking agents can also be used in a combination of two or more. Due to the nature of in-line coating, these are preferably applied in the form of an aqueous coating solution, and the resins and the crosslinking agents are preferably water-soluble or water-dispersible resins or compounds.

The polyester resin contained in the easy-to-adhere resin layer is preferably a linear polyester containing a dicarboxylic acid component and a diol component (glycol component) as constituent components.

Examples of the dicarboxylic acid component include terephthalic acid, isophthalic acid, phthalic acid, 2,6-naphthalene dicarboxylic acid, 4,4-diphenyl dicarboxylic acid, 1,4-cyclohexane dicarboxylic acid, adipic acid, sebacic acid, phenylindane dicarboxylic acid, and dimer acid. These components can be used in a combination of two or more. Additionally, unsaturated polybasic acids, such as maleic acid, fumaric acid, and itaconic acid, or hydroxycarboxylic acids, such as p-hydroxybenzoic acid and p-(β-hydroxyethoxy)benzoic acid, can be used in a small proportion together with these components. The proportion of the unsaturated polybasic acid component and/or the hydroxycarboxylic acid component is 10 mol % or less, and preferably 5 mol % or less.

A component derived from naphthalene dicarboxylic acid contained as the dicarboxylic acid component of the polyester resin increases refractive index and facilitates the control of iridescent colors under fluorescent light. Such a component can also increase moist-heat resistance. Of course, the polymerization step or copolymerization step for incorporating a naphthalene dicarboxylic acid component to polyester may be "direct polymerization" or "transesterification." The dicarboxylic acid component, such as a naphthalene dicarboxylic acid component, may be a component added in the form of its ester derivative.

The naphthalene dicarboxylic acid as described above is preferably 2,6-naphthalene dicarboxylic acid. The proportion of the naphthalene dicarboxylic acid component in the entire dicarboxylic acid component of the polyester resin is preferably 20 mol % or more, more preferably 30 mol % or more, still more preferably 50 mol % or more, and yet more preferably 60 mol % or more. A proportion of the naphthalene dicarboxylic acid component of 20 mol % or more is preferable due to the notable effect of increasing the refractive index of the easy-to-adhere resin layer. Although the proportion of the naphthalene dicarboxylic acid component in the entire dicarboxylic acid component of the polyester resin may be 100 mol %, the proportion of the naphthalene dicarboxylic acid component is preferably 95 mol % or less for the sake of flexibility of the easy-to-adhere resin layer.

As long as the effects of the present invention are provided, the following may be further used as the glycol component of the polyester resin: ethylene glycol, 1,3-propane glycol, propylene glycol, 1,4-butanediol, 1,6-hexanediol, neopentyl glycol, diethylene glycol, 1,4-cyclohexane dimethanol, xylene glycol, dimethylol propionic acid, glycerin, trimethylol propane, poly(ethyleneoxy) glycol, poly(tetramethyleneoxy) glycol, an alkylene oxide adduct of bisphenol A, etc. These substances may be used in a combination of two or more.

If the weight of a crosslinking agent in the easy-to-adhere resin layer is taken into consideration, it tends to reduce flexibility and may cause cracks in the easy-to-adhere resin layer after a folding test. In this case, the dicarboxylic acid component represented by the following formula (1) and/or the diol component represented by the following formula (2) is added to the polyester resin in a preferable embodiment.

(1) $HOOC-(CH_2)_n-COOH$ (wherein n is an integer of $4 \leq n \leq 10$)

(2) $HO-(CH_2)_n-OH$ (wherein n is an integer of $4 \leq n \leq 10$)

Adding a dicarboxylic acid component and/or diol component having a carbon component of specific length imparts flexibility to the polyester resin, makes it easier to maintain the coating film even after a folding test, and reduces, for example, cracks initiated by particle agglomerates.

The dicarboxylic acid component represented by formula (1) includes adipic acid, sebacic acid, and azelaic acid. The diol component represented by formula (2) includes 1,4-butanediol, and 1,6-hexanediol.

The polyester resin for use may be a polyester resin dissolved or dispersed in water, a water-soluble organic solvent (e.g., an aqueous solution containing less than 50 mass % of alcohol, alkyl cellosolve, ketones, or ethers), or an organic solvent (e.g., toluene, or ethyl acetate).

For a polyester resin used in the form of an aqueous coating solution, a water-soluble or water-dispersible polyester resin is used. For such water-solubilization or water-dispersion, it is preferable to copolymerize a compound containing a sulfonic acid base or a compound containing a carboxylic acid base with a monomer of polyester.

From the standpoint of coating film strength and ease of water dispersion, the polyester resin has a number average molecular weight of preferably 5000 to 40000, more preferably 10000 to 30000, and particularly preferably 12000 to 25000.

The solids content of the polyester resin in the solids of the easy-to-adhere resin layer is preferably 20 mass % or more and 90 mass % or less from the standpoint of adhesion and refractive index adjustment. The solids content of the polyester resin in the solids of the easy-to-adhere resin layer is more preferably 30 mass % or more and 80 mass % or less. The polyester resin may be a single polyester resin or a blend of two or more polyester resins. In the case of a blend of two or more polyester resins, the total of polyester resin components preferably has the above formulation.

Urethane Resin

A urethane resin for use in the easy-to-adhere resin layer contains at least a polyol component and a polyisocyanate component as constituent components, and may further optionally contain a chain extender. The urethane resin is a polymer compound formed mainly of these constituent components copolymerized via urethane bonds. Adding a polycarbonate polyol as a constituent component of a urethane resin is a preferable embodiment because it can impart flexibility to the coating film. These constituent components of a urethane resin can be identified by analysis using nuclear magnetic resonance.

Polyurethane Resin Having Polycarbonate Skeleton

The diol component, which is a constituent component of a polyurethane resin having a polycarbonate skeleton, preferably contains an aliphatic polycarbonate polyol excellent in heat resistance and hydrolysis resistance. In optical applications of the present invention, it is preferable to use aliphatic polycarbonate polyols from the standpoint of preventing yellowing.

Aliphatic polycarbonate polyols include aliphatic polycarbonate diols, and aliphatic polycarbonate triols; preferably, aliphatic polycarbonate diols can be used. Examples of aliphatic polycarbonate diols as a constituent component of the urethane resin of the present invention include aliphatic polycarbonate diols obtained by reacting one, or two or more diols (e.g., ethylene glycol, propylene glycol, 1,3-propanediol, 1,4-butanediol, 1,5-pentanediol, 3-methyl-1,5-pentanediol, 1,6-hexanediol, 1,9-nonanediol, 1,8-nonanediol, neopentylglycol, diethylene glycol, dipropylene glycol, 1,4-cyclohexanediol, and 1,4-cyclohexane dimethanol) with a carbonate (e.g., dimethyl carbonate, diphenyl carbonate, ethylene carbonate, and phosgene).

Examples of polyisocyanates as a constituent component of the urethane resin of the present invention include aromatic aliphatic diisocyanates, such as xylylene diisocyanate; alicyclic diisocyanates, such as isophorone diisocyanate, 4,4-dicyclohexylmethane diisocyanate, and 1,3-bis(isocyanatemethyl.) cyclohexane; aliphatic diisocyanates, such as hexamethylene diisocyanate and 2,2,4-trimethylhexamethylene diisocyanate; and polyisocyanates formed by pre-addition of a single member or two or more members of these compounds with trimethylolpropane etc. The polyisocyanates have no yellowing problems, and are thus preferable for optical applications where high transparency is required. The polyisocyanates are also preferable because the polyisocyanates do not make the coating film too hard, can alleviate stress caused by shrinkage or swelling of photo-curable resins, and maintain adhesion.

To impart water solubility to the urethane resin, sulfonic acid (salt) groups or carboxylic acid (salt) groups may be incorporated (copolymerized) into the urethane-molecular skeleton. Sulfonic acid (salt) groups are strongly acidic, and may have difficulty maintaining moisture resistance due to their hygroscopicity. Thus, it is suitable to introduce carboxylic acid (salt) groups, which are weakly acidic. Nonionic groups, such as polyoxyalkylene groups, may also be introduced.

To introduce carboxylic acid (salt) groups into an urethane resin, for example, a polyol compound having a carboxylic acid group, such as dimethylolpropionic acid or dimethylolbutanoic acid, is introduced as a polyol component (copolymer component) and neutralized by a salt-forming agent. Specific examples of salt-forming agents include ammonia, trialkylamines, such as trimethylamine, triethylamine, triisopropylamine, tri-n-propylamine, and tri-n-butylamine, N-alkylmorpholines, such as N-methylmorpholine, and N-ethylmorpholine, and N-dialkyl alkanolamines, such as N-dimethyl ethanolamine, and N-diethyl ethanolamine. These can be used singly, or in a combination of two or more.

When a polyol compound having a carboxylic acid (salt) group is used as a copolymerization component to impart water solubility, the compositional molar ratio of the polyol compound having a carboxylic acid (salt) group in an urethane resin is preferably 3 to 60 mol %, and more preferably 5 to 40 mol % based on the entire polyol component of the urethane resin taken as 100 mol %. A compositional molar ratio of 3 mol % or more is preferable from the standpoint of excellent water dispersibility. A compositional molar ratio of 60 mol % or less is preferable from the standpoint of water resistance retention and moist-heat resistance retention.

The urethane resin in the present invention has a glass transition temperature of preferably lower than 0° C., and more preferably lower than −5° C. A glass transition temperature of lower than 0° C. is preferable from the standpoint of the likelihood of having suitable flexibility due to stress relaxation of the coating layer.

To form a crosslinked structure in the easy-to-adhere resin layer, the easy-to-adhere resin layer may be formed by adding a crosslinking agent. Adding a crosslinking agent further improves adhesion under high temperature and high humidity conditions. Specific crosslinking agents include urea-based crosslinking agents, epoxy-based crosslinking agents, melamine-based crosslinking agents, isocyanate-based crosslinking agents, oxazoline-based crosslinking agents, and carbodiimide-based crosslinking agents. Of these, melamine-based crosslinking agents, isocyanate-based crosslinking agents, oxazoline-based crosslinking agents, and carbodiimide-based crosslinking agents are preferred from the standpoint of the stability of the coating solution over time and the effect of improving adhesion in high-temperature and high-humidity treatment. To promote a crosslinking reaction, a catalyst and other substances can optionally be used.

When the easy-to-adhere resin layer contains a crosslinking agent in its structure, the content of the crosslinking agent is preferably 5 mass % or more and 50 mass % or less, and more preferably 10 mass % or more and 40 mass % or less of the total solid component of the coating layer. A content of the crosslinking agent of 10 mass % or more is preferable from the standpoint of the maintenance of strength of the resin in the easy-to-adhere resin layer and excellent adhesion under high temperature and high humidity conditions. A content of the crosslinking agent of 40 mass % or less is preferable from the standpoint of the maintenance of flexibility of the resin in the coating layer and maintenance of adhesion after a repeated folding test at room temperature, or at high temperature and high humidity.

The easy-to-adhere resin layer according to the present invention preferably contains at least one compound selected from the group consisting of titanium compounds and zirconium compounds. The iridescent colors (interference mottling) of a hard coating film are thought to be caused by the large difference between the refractive index of the polyester film (e.g., 1.62 to 1.65), which is a substrate, and the refractive index of the hard coating layer (e.g., 1.52) that contains acrylic resin etc. To reduce the difference in refractive index between layers and prevent interference mottling, it is important to control the refractive index of the easy-to-adhere resin layer so that the difference in refractive index between the polyester film and the easy-to-adhere resin layer, and the difference in refractive index between the easy-to-adhere resin layer and the hard coating layer, are small. When controlling the refractive index of the easy-to-adhere resin layer containing a binder resin and particles as main components, adding the compounds with a high refractive index as described above makes control easier. Examples of titanium compounds include water-soluble titanium chelate compounds, water-soluble titanium acylate compounds, titanium oxide, and titanium chloride. Of these, titanium dioxide (titania) is preferably used. Examples of zirconium compounds include water-soluble zirconium chelate compounds, water-soluble zirconium acylate compounds, zirconium acetate, zirconium hydroxide, and zirconium oxide. Of these, zirconium dioxide (zirconia) is preferably used. The compounds with a high refractive index described above are also preferably in a particulate form.

The mean particle size of metal oxide particles, such as zirconium dioxide, is preferably 5 nm or more and 150 nm or less, more preferably 10 nm or more and 100 nm or less, and still more preferably 30 nm or more and 70 nm or less.

Designing the mean particle size of fine metal oxide particles so as to fall within the above ranges can decrease film haze. Additionally, the particulate metallic compound is preferably designed to have a particle size smaller than the thickness of the easy-to-adhere resin layer in order to achieve a buffering effect in repeated folding; the particle size is preferably small enough to prevent particle aggregation. It is preferable to suppress particle aggregation from the standpoint of preventing aggregated particles from becoming a starting point for cracks in the easy-to-adhere resin layer during folding.

The amount of the particulate metal compound added is designed to be preferably 0.1 mass % or more and less than 15 mass % in the easy-to-adhere resin layer from the standpoint of achieving a buffering effect during folding of the easy-to-adhere resin layer, or from the standpoint of preventing the particulate metal compound from becoming starting points of cracks due to particle aggregation. The amount of the particulate metal compound added is more preferably 0.5 mass % or more and 14 mass % or less, and still more preferably 1 mass % or more and 13 mass % or less. Adding particles in an amount within these ranges is preferable because it makes it unlikely that aggregated particles will form in the easy-to-adhere resin layer, and because interference mottling does not easily occur even after a folding test due to the absence of cracks caused by aggregated particles in the easy-to-adhere resin layer during repeated folding.

The particulate metal compound in the easy-to-adhere resin layer is preferably present in a proportion smaller in the direction of the folding portion than in the bending direction. Fine cracks formed during repeated folding tend to occur in the direction of the folding portion, in which a load is applied in the thickness direction. Thus, reducing the particle frequency in the direction of the folding portion is considered to suppress the formation of cracks. Reducing the particle frequency is considered to reduce the proportion of aggregated particles and the frequency of crack propagation. The proportion of particles present in each direction can be confirmed by observing the cross-section with a transmission electron microscope (TEM).

Forming an easy-to-adhere resin layer by an in-line coating technique is preferred as a way to change the proportion of the particulate metal compound present in each direction of the easy-to-adhere resin layer. Because the in-line coating technique involves a step of stretching a coated film in at least one direction after applying a coating solution containing an easy-to-adhere resin material, the proportion of particles in the easy-to-adhere resin layer is thought to be changeable by adjusting the draw ratio.

The particulate metal compound may be used in combination with a dispersant to prevent aggregation. The dispersant for use in the present invention can be any polymer compound that can maintain the binder resin composed of an emulsion and that can dissolve or disperse a crosslinking agent, described below, while being capable of dispersing the fine metal oxide particles.

Specifically, known polymer dispersants such as polyvinyl, polyacrylic acid, polycarboxylic acid, and polyurethane are usable. More specifically, polyvinyl polymers for use include polyvinyl alcohol, polyvinyl pyrrolidone, polyvinyl acetate, polyvinyl ester, and copolymers thereof; polyacrylic acid polymers for use include polyacrylic acid, sodium polyacrylate, ammonium polyacrylate, and copolymers thereof; polycarboxylic acid polymers for use include polycarboxylic acid, sodium polycarboxylate, ammonium polycarboxylate, and copolymers thereof; and polyurethane polymers for use include polyurethane and copolymers thereof. Additionally, copolymers of these polymers or copolymers of these polymers with a sulfonic acid polymer are also usable. Of these, the dispersant for fine metal particles is preferably an acrylic resin such as a polyacrylic acid polymer.

The metal oxide particles more preferably contain a dispersant partially or entirely on the surface of each particle. Adding a dispersant provides the effect of suppressing the aggregation of metal oxide particles. An easy-to-adhere resin layer containing such particles is expected to relieve stress during a repeated folding test while maintaining the transparency of the coating film. Adding a dispersant is preferable because it makes it difficult for metal oxide particles to aggregate and for cracks to form in the easy-to-adhere resin layer, depending on the coating film formation process.

The method of performing surface treatment on metal oxide particles with acrylic resin is not particularly limited. Specifically, such methods include the method of adding a mixture of metal oxide particles and acrylic resin that are mixed beforehand to a solvent and then dispersing the mixture, and the method of adding metal oxide particles and acrylic resin to a solvent in sequence and then dispersing them.

The dispersing device for use includes dissolvers, high-speed mixers, homomixers, kneaders, ball mills, roll mills, sand mills, paint shakers, SC mills, annular mills, and pin mills.

The amount of the dispersant added to metal oxide particles is preferably 5 mass % or more and less than 40 mass % based on the mass of the metal oxide particles. An amount of a dispersant of 5 mass % or more is preferable from the standpoint of achieving excellent dispersibility of metal oxide particles in the easy-to-adhere resin layer. An amount of a dispersant of less than 40 mass % is preferable from the standpoint of the ease of adjusting the refractive index of the easy-to-adhere resin layer by taking advantage of the characteristics of metal oxide particles. The amount of a dispersant added is more preferably 10 mass % or more and 30 mass % or less.

In the present invention, iridescent colors (interference mottling) can be reduced by designing the refractive index of the easy-to-adhere resin layer so as to fall within a predetermined range and satisfying the thin-film interference principle. Additionally, filling the easy-to-adhere resin layer with a metal compound in a predetermined amount used for refractive index adjustment is thought to have the effect of buffering the damage to the easy-to-adhere resin layer during repeated folding.

The thickness of the easy-to-adhere resin layer that can reduce iridescent colors (interference mottling) can be adjusted so as to satisfy the equation $2nd=\lambda b/4$. In the equation, n is the refractive index of the easy-to-adhere resin layer, d is the thickness of the easy-to-adhere resin layer, and $\lambda b$ is the bottom wavelength of a reflectance spectrum, which can be set appropriately within the range of 450 to 650 nm.

Because the polyester film provided with the easy-to-adhere resin layer in the present invention is designed to have different refractive indices in the bending direction and in the direction of the folding portion, it is preferable to control the refractive index of the easy-to-adhere resin layer, considering each direction.

The refractive index of the easy-to-adhere resin layer is preferably controlled so as to be lower than the refractive index in the bending direction of the polyester film having the easy-to-adhere resin layer stacked thereon but not yet having the hard coating layer stacked thereon. The difference in refractive index between the easy-to-adhere resin layer and the polyester film having the easy-to-adhere resin layer stacked thereon but not yet having the hard coating layer stacked thereon in the bending direction is within the range of preferably more than 0 and 0.070 or less, more preferably 0.005 or more and 0.065 or less, and still more preferably 0.010 or more and 0.060 or less. A refractive index of the easy-to-adhere resin layer lower than the refractive index of the polyester film in the bending direction is preferable because it leads to a smaller difference in refractive index between the easy-to-adhere resin layer and the hard coating layer stacked thereon, thereby effectively reducing iridescent colors (interference mottling). A difference in refractive index of 0.070 or less between the easy-to-adhere resin layer and the polyester film in the bending direction is preferable because the difference in refractive index is not too large, thereby effectively reducing iridescent colors (interference mottling). The bending direction is under compressive stress when the easy-to-adhere resin layer is folded inward, and is under tensile stress when the easy-to-adhere resin layer is folded outward. Thus, it is preferable to form the easy-to-adhere resin layer from a resin component that contains more amorphous resin rather than a resin component that contains more crystalline structures. More preferably, an appropriate amount of a metal compound is preferably added to compensate for the refractive index.

The refractive index of the easy-to-adhere resin layer is also preferably controlled so as to be lower than the refractive index in the direction of the folding portion of the polyester film having the easy-to-adhere resin layer stacked thereon but not yet having the hard coating layer stacked thereon. The difference between the refractive index of the easy-to-adhere resin layer and the refractive index in the direction of the folding portion of the polyester film having the easy-to-adhere resin layer stacked thereon but not yet having the hard coating layer stacked thereon is preferably 0.080 or more and 0.150 or less, more preferably 0.085 or more and 0.14 or less, and still more preferably 0.090 or more and 0.13 or less. A refractive index of the easy-to-adhere resin layer lower than the refractive index in the direction of the folding portion of the polyester film is preferable because it leads to a smaller difference in refractive index between the easy-to-adhere resin layer and the hard coating layer stacked thereon, thereby effectively reducing iridescent colors (interference mottling). A difference in refractive index of 0.150 or less is preferable because the difference in refractive index between the easy to-adhere resin layer and the polyester film is not too large, thereby effectively reducing iridescent colors (interference mottling).

To impart smoothness to the easy-to-adhere layer, it is preferable to add particles. The fine particles preferably have a mean particle size of 2 µm or less. Particles having a mean particle size of more than 2 µm are more likely to come off from the easy-to-adhere layer. Examples of particles to be contained in the easy-to-adhere layer include inorganic particles, such as titanium oxide, barium sulfate, calcium carbonate, calcium sulfate, silica, alumina, talc, kaolin, clay, calcium phosphate, mica, hectorite, zirconia, tungsten oxide, lithium fluoride, and calcium fluoride; and organic polymer particles, such as styrene-based particles, acrylic-based particles, melamine-based particles, benzoguanamine-based particles, and silicone-based particles. One type of these particles may be added to the easy-to-adhere layer, or a combination of two or more types may be added to the easy-to-adhere layer. To impart moderate slipperiness to the coating layer, silica particles having a mean particle size of 200 nm or more and 700 nm or less can be particularly preferably used.

The amount of particles added for smoothness is preferably less than 1 mass % of the easy-to-adhere resin layer. An amount of particles of less than 1 mass % is preferable because it leads to particles larger than the thickness of the easy-to-adhere resin layer being present fewer in the easy-to-adhere resin layer, and makes it less likely for cracks to propagate during folding. In a more preferable embodiment, the amount of particles added for smoothness is 0.5 wt % or less.

The method for applying the coating solution for use may be a known method as in the coating layer described above. Examples of methods for applying the coating solution include reverse roll coating, gravure coating, kiss coating, roll brush, spray coating, air-knife coating, wire-bar coating, and pipe doctor. These methods can be used singly or in combination.

Hard Coating Layer

When the polyester film of the present invention is used as a surface protection film for a foldable display by positioning the polyester film on the surface of the display, the polyester film preferably has a hard coating layer on at least one surface of the film. The hard coating layer is preferably used in a display by positioning on the surface of the polyester film that is the front surface of the display. The resin for forming the hard coating layer can be any resin without particular limitation, such as siloxane resins, inorganic hybrid resins, acrylic resins, urethane acrylate resins, polyester acrylate resins, and epoxy resins. These resins may also be used in a combination of two or more. The resin for use may contain particles such as inorganic filler or organic filler.

The resin for forming the hard coating layer includes compounds having a (meth)acrylate-based functional group, such as polyester (meth)acrylate, urethane (meth)acrylate, epoxy (meth)acrylate, and silicone (meth)acrylate, and compounds having a functional group with an unsaturated double bond, such as an allyl group and a vinyl group. To increase the level of hardness of the hard coating layer, polyfunctional monomers may be used in combination. Examples of polyfunctional monomers include trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate. These materials can be used singly, or in a combination of two or more.

It is preferable to add a photoinitiator when using UV light as active energy beams for curing the hard coating layer. The photoinitiator may be a radical polymerization initiator, a cationic polymerization initiator, or a mixed photoinitiator of cationic and radical polymerization initiators; however, a radical polymerization initiator is particularly preferred due to its high reaction rate and excellent productivity. Examples of UV-light radical polymerization initiators include alkylphenones, benzoins, benzophenones, phosphine oxides, ketals, anthraquinones, thioxanthones, azo compounds, peroxides, 2,3-dialkyldione compounds, disulfide compounds, fluoroamine compounds, aromatic sulfoniums, titanocenes, and oxyphenyl acetate. These compounds can be used singly, or in a combination of two or more. More specific examples include carbonyl compounds, such as acetophenone, 2,2-diethoxyacetophenone, p-dimethylacetophenone, p-dimethylaminopropiophenone, benzophenone, 2-chlorobenzophenone, 4,4'-dichlorobenzophenone, 4,4'-bis-diethylaminobenzophenone, Michler's ketone, benzyl, benzoin, benzoin methyl ether, benzoin ethyl ether, benzoin isopropyl ether, methyl benzoylformate, p-isopropyl-α-hydroxyisobutylphenone, α-hydroxyisobutylphenone, 2,2-dimethoxy-2-phenylacetophenone, and 1-hydroxycyclohexyl phenyl ketone; sulfur compounds, such as tetramethylthiuram monosulfide, tetramethylthiuram disulfide, thioxanthone, 2-chlorothioxanthone, and 2-methylthioxanthone; and peroxide compounds, such as benzoyl peroxide, and di-t-butylperoxide. The lower limit of the amount of the photoinitiator added is 0.1 parts by mass or more, and more preferably 1 part by mass or more, per 100 parts by mass of active-energy-beam-curative resin. The upper limit of the amount of the photoinitiator added is 30 parts by mass or less, and more preferably 20 parts by mass or less, per 100 parts by mass of active-energy-beam-curative resin. An amount of the photoinitiator of 0.1 parts by mass or more is preferable because it can increase the level of hardness of the hard coating layer. An amount of the photoinitiator of 30 parts by mass or less is preferable because it prevents yellowing of the hard coating layer, and achieves a sufficient level of hardness of the hard coating layer.

Additionally, the hard coating layer may contain various additives to the extent that such additives do not interfere with the performance of the hard coating. Examples of additives include polymerization inhibitors, crosslinking agents, antistatic agents, adhesiveness improvers, antioxidants, leveling agents, coupling agents, antifoaming agents, bulking agents, solvents, antiglare agents, antireflective agents, inorganic fillers, and organic fillers.

From the standpoint of reducing the iridescent colors (interference mottling) of the hard coating film, the hard coating layer preferably has a refractive index lower than the refractive index of the easy-to-adhere resin layer.

Film Thickness of Hard Coating Layer

The film thickness of the hard coating layer is preferably 1 to 50 µm. A film thickness of 1 µm or more ensures sufficient curing. To increase the pencil hardness, the film thickness of the hard coating layer is more preferably 5 µm or more. A film thickness of 50 µm or less suppresses curling caused by hardening and contraction of the hard coating, thus increasing film handleability.

Coating Method

The method for forming a hard coating layer for use may be, for example, a Mayer bar, gravure coater, die coater, or knife coater. These methods can be used without any particular limitation and can be suitably selected according to viscosity and film thickness.

Curing Conditions

The method for curing the hard coating layer for use may be a method using energy beams such as UV light or electron beams, or a method using heat. From the standpoint of minimizing damage to the film, a method using energy beams such as UV light or electron beams is preferable.

Pencil Hardness

The pencil hardness of the hard coating layer is preferably 3H or higher, and more preferably 4H or higher. A pencil hardness of 3H or higher prevents the hard coating layer from being easily scratched, while not decreasing visibility. Although a higher level of pencil hardness of the hard coating layer is generally better, the pencil hardness may be 9H or lower or 8H or lower; even a hard coating layer with a pencil hardness of 6H or lower is usable in practice without problems.

Properties of Hard Coating Layer

The hard coating layer in the present invention can be used for the purpose of protecting a display by increasing the pencil hardness of the surface as described above, and preferably has high transmittance. The hard coating film has a transmittance of preferably 85% or more, more preferably 87% or more, and still more preferably 88% or more. A transmittance of 85% or more ensures sufficient visibility. In general, a higher total light transmittance of the hard coating film is preferable. However, from the standpoint of stable production, the total light transmittance of the hard coating film is preferably 99% or less, and may be 97% or less. In general, the hard coating film preferably has a lower haze, and preferably a haze of 3% or less. The hard coating film has a haze of more preferably 2% or less, and most preferably 1% or less. A haze of 3% or less can improve the visibility of images. Although a lower haze is generally better, the haze of the hard coating film is preferably 0.1% or more, or may be 0.3% or more, from the standpoint of stable production.

The hard coating layer may have further functions added. For example, a hard coating layer with additional functionality, such as an anti-glare layer, anti-glare anti-reflective layer, anti-reflective layer, low-reflection layer, or antistatic layer having the predetermined pencil hardness above, can also be preferably used in the present invention.

The polyester film used as a substrate film of a touchscreen module may also be provided with a hard coating layer. For example, when an ITO layer is used as a transparent electrode layer of a touchscreen module, a refractive index adjustment layer is preferably provided between the substrate film and the transparent electrode layer to make the electrode pattern less visible. In this case, the hard coating layer itself may also serve as a refractive index adjustment layer, or a separate refractive index adjustment layer may be laminated.

EXAMPLES

The following describes the present invention with reference to Examples and Comparative Examples. First, the methods for evaluating characteristic values used in the polyester film of the present invention are described below.

(1) Intrinsic Viscosity

A film or polyester resin was crushed, dried, and dissolved in a mixed solvent of phenol and tetrachloroethane in a ratio of phenol to tetrachloroethane of 60/40 (mass ratio). This solution was then centrifuged to remove inorganic particles. The flow time of the solution with a concentration of 0.4 (g/dl) and the flow time of the solvent alone were measured with an Ubbelohde viscometer at 30° C. From the time ratio, the intrinsic viscosity was calculated by using the Huggins equation under the assumption that the Huggins's constant was 0.38.

(2) Density

The density was measured in accordance with the method described in JIS K 7112:1999 (density-gradient tube method) (unit: $g/cm^3$).

(3) Average Particle Size of Particles in Polyester Film or Easy-to-Adhere Resin Layer The average particle size is measured by observing the particles in the cross-section of the film with a scanning electron microscope. Specifically, 50 particles are observed, and the average value of the particle sizes of the particles is defined as the average particle size. The particle size of a non-spherical irregular-shaped particle can be calculated as an equivalent circle diameter. The equivalent circle diameter is a value obtained by dividing the area of the observed particle by n, calculating the square root, and doubling the value of the square root. (The unit depends on the average particle size, but mainly nm is used.)

(4) Refractive Index of Polyester Film Having Easy-to-Adhere Resin Layer Stacked Thereon but not Yet Having Hard Coating Layer Stacked Thereon In accordance with JIS K 7142:2008 (Plastic: Determination of refractive index (method A)), the refractive index in the longitudinal direction, the refractive index in the width direction, and the refractive index in the thickness direction of the polyester film having an easy-to-adhere resin layer stacked thereon but not yet having a hard coating layer stacked thereon were determined with an Abbe refractometer (NAR-4T, produced by Atago Co., Ltd., measurement wavelength: 589 nm).

(5) Refractive Index of Easy-to-Adhere Resin Layer

The refractive index of the easy-to-adhere resin layer can be calculated by the fitting of the measured reflectance spectrum and the reflectance spectrum calculated from the optical model of the thin film using the Fresnel coefficient, using a spectrophotometer (product name "UV-3150," produced by Shimadzu Corporation). In order to prevent reflection on the back surface, the measurement is performed after a black vinyl tape (e.g., product name "Yamato Vinyl Tape NO200-38-21," produced by Yamato Co., Ltd., width: 38 mm) having a width larger than the area of the measurement spot is applied to the surface of the PET substrate opposite to the surface to which the easy-to-adhere resin layer whose refractive index is to be measured is applied (the back surface; or when easy-to-adhere resin layers are formed on both sides, the surface of the easy-to-adhere resin layer on the side on which the refractive index is not measured).

(6) Bending Resistance of Polyester Film Sample (Bend Radius: 1.5 mm)

A polyester film sample having a size of 20 mm in its width direction and 110 mm in its machine direction was prepared. The sample was bent 200,000 times at a rate of once per second using a tension-free U-shape folding test jig (DLDMLH-FS, produced by Yuasa System Co., Ltd.) with the bend radius being set to 1.5 mm. In this case, the sample was fixed at positions 10 mm away from both end portions on its long side; hence, the part to be bent had a size of 20 mm×90 mm. Here, FIG. 1 is a schematic view for illustrating a bend radius at a time when a foldable display is folded, and in consideration of a case in which a polyester film is arranged on the inside surface of the folded mode, the bending test is performed as a model assuming that the portion denoted by reference numeral 11 in FIG. 1 is set to 1.5 mm. After the completion of the bending treatment, the sample was placed on a flat surface with its bending inside facing down, and was visually observed.

○: No crack and deformation can be recognized on the sample.

×: The sample has a crack or a fold mark, and has a maximum floating height of 5 mm or more when horizontally placed.

(7) Bending Resistance of Polyester Film Sample (Bend Radius: 0.5 mm)

A polyester film sample was bent 200,000 times at a rate of once per second by the same method as in the above-mentioned bending test with the bend radius being set to 0.5 mm. Here, FIG. 1 is a schematic view for illustrating a bend radius at a time when a foldable display is folded; and in consideration of a case in which a polyester film is arranged on the inside surface of the folded mode, the bending test is performed as a model assuming that the portion denoted by reference numeral 11 in FIG. 1 is set to 0.5 mm. The film surface on the outside of the bent portion was observed with a digital microscope (RH8800, produced by Hirox Co., Ltd.) at a magnification of 700, and the presence or absence of a wrinkle (crack) was observed. Separate from the above-mentioned bending resistance visual observation test at a bend radius of 1.5 mm, this test, in which the bend radius was reduced to 0.5 mm, was performed with the intention of performing evaluation under a state closer to the state of actual use of a foldable display having a hard coating layer and other members laminated or bonded thereto. Separate from the above-mentioned visual observation at a bend radius of 1.5 mm, this test is intended to detect a defect in terms of being liable to fracture or being liable to crack, which is a minute defect that is difficult to detect by visual observation.

○: No defect is found on the film surface on the outside of the bending.

×: Fracture occurred, or a wrinkle (crack) can be recognized on the film surface on the outside of the bending.

(8) Indentation Depth after Test Force is Unloaded

A sample was cut to a size of about 2 cm×2 cm, and the surface opposite to the surface to be measured was immobilized on a micro cover glass (18×18 mm, produced by Matsunami Glass Ind., Ltd.) with an adhesive (Cemedine (registered trademark) High-super 30). After being adhered and immobilized, the sample was allowed to stand for at least 12 hours at room temperature. Thereafter, the sample was measured for indentation depth ($\mu$m) after a test force was unloaded with a DUH-211 dynamic ultra-micro hardness tester (Shimadzu Corporation) under the following conditions.

Measurement Condition

Test mode: loading-unloading test

Indenter for use: edge angle 115°, triangular pyramid indenter

Indenter elasticity: $1.140 \times 10^6$ N/mm$^2$

Indenter Poisson's ratio: 0.07

Test force: 50 mN

Loading rate: 4.44 mN/sec

Loading retention time: 2 sec

Unloading retention time: 0 sec (9) Total Light Transmittance and Haze

Total light transmittance and haze were measured with a NDH5000 haze meter (produced by Nippon Denshoku Industries Co., Ltd.) using a polyester film having an easy-to-adhere resin layer stacked thereon as a sample.

(10) Maximum Heat Shrinkage

A sample film of a polyester film having an easy-to-adhere resin layer stacked thereon was cut to a size of 10 mm (length)×250 mm (width), and a long side was aligned with the direction to be measured and marked at intervals of 200 mm. Distance A, which is between the marks, was measured under a constant tension of 5 g. Subsequently, the sample film was allowed to stand in atmosphere at 150° C. in an oven for 30 minutes without a load, and then taken out of the oven, followed by cooling to room temperature. Thereafter, distance B, which is between the marks, was measured under a constant tension of 5 g, and the heat shrinkage (%) was determined by using the following formula. The heat shrinkage was measured at three evenly separated points in the width direction of the sample film, and the average of the values at the three points was taken as the heat shrinkage (%).

$$\text{Heat shrinkage}(\%) = [(A-B) \times 100]/A$$

The sample film was cut so that the vertical and horizontal directions were different for both the bending direction and the folding direction, and measurement was performed. The data of the direction larger in measurement value was taken as the maximum heat shrinkage (%).

(11) Refractive Index of Hard Coating Layer

The refractive index of the hard coating layer can be calculated by the fitting of the measured reflectance spectrum and the reflectance spectrum calculated from the optical model of the multilayered thin film using the Fresnel coefficient, using a spectrophotometer (product name "UV-3150," produced by Shimadzu Corporation). The reflectance spectrum of the hard coating layer is measured after a hard coating composition is applied to a 50-μm thick polyethylene terephthalate (PET) substrate having no easy-to-adhere resin layer stacked thereon, and cured to form a hard coating layer with a thickness of 1 to 10 μm; and a black vinyl tape (e.g., product name "Yamato Vinyl Tape NO200-38-21," produced by Yamato Co., Ltd., width: 38 mm) having a width larger than the area of the measurement spot is applied, in order to prevent reflection of the back surface, to the surface (back surface) of the PET substrate opposite to the surface to which the hard coat layer is formed.

(12) Improvement of Interference Mottling of Hard Coating Film (Iridescent Color)

A hard coating film was cut into a size of 50 mm (film width direction)×110 mm (film longitudinal direction) to prepare a sample film. A black glossy tape (produced by Nitto Denko Corporation, Vinyl Tape No. 21, black) was bonded to the side opposite to the surface of the obtained test film on which the hard coating layer was stacked. The hard coating surface of the sample film was placed on top, and observed using a three-wavelength type daylight color (National Palook, F.L 15EX-N 15W) as a light source at a positional relationship where the reflection appears strongest when viewed visually from an obliquely upward direction (a distance from the light source of 40 to 60 cm and an angle of 15 to 45° relative to the film surface.)

The results of visual observation are ranked according to the following criteria. The observation is made by five persons who are familiar with the evaluation, and the rank chosen by the greatest number of persons is the evaluation rank. If two ranks include the same number of persons, the middle rank of the three separate ranks was adopted. For example, if ⊚ and ◯ each include two persons and Δ includes one person, ◯ is adopted; if ⊚ includes one person and ◯ and Δ each include two persons, ◯ is adopted; if ⊚ and Δ each include two persons and ◯ includes one person, ◯ is adopted.

⊚: No iridescent color is observed even when the sample is observed from various angles.
◯: Iridescent color is slightly observed at a particular angle.
Δ: Iridescent color is slightly observed.
x: Iridescent color is clearly observed.

(13) Bending Test Property of Hard Coating Film

A hard coating film was cut to a size of 50 mm in its width direction and 110 mm in its machine direction to prepare a sample film. The obtained sample film was bent 200,000 times in a manner such that the easy-to-adhere resin layer and the hard coating layer are placed inside at a rate of once per second by the same method as in the above-mentioned bending test with the bend radius being set to 3.0 mm. The sample was placed on a flat surface with its bending inside facing down, and the bending portion of the sample after the test was visually observed.

○: No crack and deformation can be recognized on the sample.
x: The sample has a crack or a fold mark.

(14) Observation of Interference Mottling (Iridescent Color) after Bending Test of Hard Coating Film The bending portion of the sample film after the bending test of the hard coating film was observed in the same manner as in the Improvement of Interference Mottling section. Specifically, a black glossy tape (produced by Nitto Denko Corporation, Vinyl Tape No. 21, black) was bonded to the side opposite to the surface of the obtained test film on which the hard coating layer was stacked. The hard coating surface of the sample film was placed on top, and observed using a three-wavelength type daylight color (National Palook, F.L 15EX-N 15W) as a light source at a positional relationship where the reflection appears strongest when viewed visually from an obliquely upward direction (a distance from the light source of 40 to 60 cm and an angle of 15 to 45° relative to the film surface.) The results of visual observation are ranked according to the following criteria. The observation is made by five persons who are familiar with the evaluation, and the rank chosen by the greatest number of persons is the evaluation rank. If the two ranks include the same number of persons, the middle rank of the three separate ranks was adopted. For example, if ⊚ and ◯ each include two persons and Δ includes one person, ◯ is adopted; if ⊚ includes one person, and ◯ and Δ each include two persons, ◯ is adopted; if ⊚ and Δ each include two persons and ◯ includes one person, ◯ is adopted.

⊚: No iridescent color is observed even when the sample is observed from various angles.
◯: Iridescent color is slightly observed at a particular angle.
Δ: Iridescent color is slightly observed.
x: Iridescent color is clearly observed.

This test is performed for the purpose of detecting interference mottling caused by minute adhesion defects such as cracks or interface peeling between the hard coating layer and the easy-to-adhere resin layer, or between the easy-to-adhere resin layer and the polyester film layer.

(15) Pencil Hardness

Pencil hardness was measured under a load of 750 g at rate of 1.0 mm/s with the pencil hardness of a hard coating film as a sample in accordance with JIS K 5600-5-4:1999. In the present invention, a pencil hardness of 3H or more was rated as passing.

Preparation of Polyethylene Terephthalate Pellet (R1)

The esterification reactor for use was a continuous esterification reactor composed of a three-stage complete mixing tank equipped with a stirrer, a partial condenser, a feedstock inlet, and a product outlet. Slurry of TPA in an amount of 2 tons/hr, 2 mol of EG per mol of TPA, and antimony trioxide in an amount of 160 ppm on an Sb atom basis relative to a produced PET was continuously supplied to the first esterification reaction vessel of the esterification reactor, and allowed to react at 255° C. under ordinary pressure with an average residence time of 4 hours. Subsequently, the reaction product in the first esterification reaction vessel was continuously taken out of the system and supplied to the second esterification reaction vessel. EG distilled from the first esterification reaction vessel in an amount of 8 mass % of the produced polymer (produced PET) was then supplied to the second esterification reaction vessel, and an EG solution containing magnesium acetate in an amount of 65 ppm on an Mg atom basis relative to the produced PET, and an EG solution containing TMPA in an amount of 20 ppm on a P atom basis relative to the produced PET were further added thereto, followed by a reaction at 260° C. under ordinary pressure with an average residence time of 1.5 hours. Subsequently, the reaction product in the second esterification reaction vessel was continuously taken out of the system and supplied to the third esterification reaction vessel, and an EG solution containing TMPA in an amount of 20 ppm on a P atom basis relative to the produced PET was further added thereto, followed by a reaction at 260° C. under ordinary pressure with an average residence time of 0.5 hours. The esterified reaction product generated in the third esterification reaction vessel was continuously supplied to a three-stage continuous polycondensation reactor to perform polycondensation, and filtered through a sintered stainless-steel filter material (nominal filtration accuracy: 5-μm particles are 90% cut), thereby obtaining polyethylene terephthalate pellet (R1) with an intrinsic viscosity of 0.62 dl/g.

Preparation of Polyethylene Terephthalate Pellet (R2)

Polyethylene terephthalate pellet (R2) was obtained in the same manner as above by adjusting the intrinsic viscosity to 0.580 dl/g, except that the residence time of the third esterification reaction was adjusted in the production step of polyethylene terephthalate pellet (R1).

Preparation of Polyethylene Terephthalate Pellet (R3)

Polyethylene terephthalate pellet (R3) with an intrinsic viscosity of 0.75 dl/g was obtained by subjecting polyethylene terephthalate pellet (R1) to solid-state polymerization at 220° C. under a reduced pressure of 0.5 mmHg for a different period of time with a rotary vacuum polymerizer.

Polymerization of Copolymer Polyester Resin

Polymerization of copolymer polyester resins (a1) to (a3) for forming easy-to-adhere resin layers was performed as follows.

410.3 parts by mass of dimethyl 2,6-naphthalene dicarboxylate, 46.3 parts by mass of sebacic acid, 42.5 parts by mass of sodium dimethyl 5-sulfoisophthalate, 175.6 parts by mass of ethylene glycol, 29.2 parts by mass of diethylene glycol, 204.2 parts by mass of 1,6-hexanediol, and 0.5 parts by mass of tetra-n-butyl titanate were placed in a stainless steel autoclave equipped with a stirrer, a thermometer, and a partial reflux condenser. A transesterification reaction was performed at a temperature of 160 to 220° C. for 4 hours. Subsequently, the temperature was raised to 255° C., and the pressure of the reaction system was gradually reduced. A reaction was then performed at a reduced pressure of 30 Pa for one hour and a half, thus obtaining a copolymer polyester resin (a1). The obtained copolymer polyester resin was pale yellow and transparent. The composition of the copolymer polyester resin (a1) is as shown in Table 1.

Copolymer polyester resins (a2) and (a3) each having a composition shown in Table 1 were obtained in the same manner by changing raw materials. Table 1 shows the results of the compositions and weight average molecular weights of these copolymer polyester resins measured by 1H-NMR.

TABLE 1

| | Composition | a1 | a2 | a3 |
|---|---|---|---|---|
| Acid component (mol %) | Naphthalenedicarboxylic acid | 82 | 0 | 74 |
| | Terephthalic acid | 0 | 47 | 20 |
| | Isophthalic acid | 0 | 46 | 0 |
| | Sebacic acid | 11 | 0 | 0 |
| | Adipic acid | 0 | 0 | 0 |
| | 5-Sodium isophthalate | 7 | 3 | 6 |
| Glycol component (mol %) | Ethylene glycol | 55 | 50 | 84 |
| | Diethylene glycol | 5 | 0 | 16 |
| | Neopentyl glycol | 0 | 50 | 0 |
| | 1,6-Hexanediol | 40 | 0 | 0 |
| | Number average molecular weight | 20000 | 18000 | 18000 |

Preparation of Water Dispersion of Copolymerized Polyester Resin

Twenty-five parts by mass of the copolymer polyester resin (a1) and 15 parts by mass of ethylene glycol t-butyl ether were placed in a reactor equipped with a stirrer, a thermometer, and a reflux condenser. The resulting mixture was heated at 110° C. and stirred to dissolve the resin. After the resin was completely dissolved, 60 parts by mass of water was gradually added to the polyester solution while stirring. After the addition, the resulting mixture was cooled to room temperature while stirring, thus preparing a milky-white aqueous copolymer polyester dispersion (Aw-1) with a solids content of 25 mass %. In the same manner, copolymer polyester resins (a2) and (a3) were used in place of the copolymer polyester resin (a1) to prepare aqueous dispersions (Aw-2) and (Aw-3).

Polymerization of Urethane Resin 72.96 parts by mass of 1,3-bis(methylisocyanate) cyclohexane, 12.60 parts by mass of dimethylol propionic acid, 11.74 parts by mass of neopentyl glycol, 112.70 parts by mass of polycarbonate diol with a number average molecular weight of 2000, and as solvents, 85.00 parts by mass of acetonitrile and 5.00 parts by mass of N-methylpyrrolidone were placed in a four-necked flask equipped with a stirrer, a Dimroth condenser, a nitrogen-feeding tube, a silica-gel-drying tube, and a thermometer, and stirred in a nitrogen atmosphere at 75° C. for 3 hours; the reaction mixture was confirmed to have reached a predetermined amine equivalent. Subsequently, after this reaction mixture was cooled to 40° C., 9.03 parts by mass of triethyl amine was added, thereby obtaining a polyurethane prepolymer solution. Subsequently, 450 g of water was added to a reactor equipped with a homogenizing disperser capable of high-speed stirring, and the temperature was adjusted to 25° C., followed by dispersing an isocyanate-terminated prepolymer in water with stirring at 2000 min$^{-1}$. Thereafter, some acetonitrile and water were removed under reduced pressure, thereby preparing water-soluble polyurethane resin (B-1) with a solids content of 35 mass %.

Preparation of Self-Crosslinked Polyurethane Resin Aqueous Solution 100 parts by mass of polyester diol (OHV: 2000 eq/ton) formed of adipic acid, 1,6-hexanediol, and neopentyl glycol (molar ratio: 4/2/3) and 41.4 parts by mass of xylylene diisocyanate were mixed; and then reacted at 80 to 90° C. for 1 hour in a nitrogen stream, followed by cooling to 60° C. 70 parts by mass of tetrahydrofuran was added and dissolved, thereby obtaining a urethane prepolymer solution (NCO/OH ratio: 2.2; free isocyanate group: 3.30 mass %). Subsequently, the urethane prepolymer solution was adjusted to 40° C.; and 45.5 parts by mass of a 20 mass % sodium bisulfite aqueous solution was added, followed by reaction at 40 to 50° C. for 30 minutes with intense stirring. After the free isocyanate group content (on a solids basis) was confirmed to have disappeared, the reaction product was diluted with emulsified water, thereby obtaining a self-crosslinked polyurethane resin aqueous solution (B-2) containing isocyanate groups blocked by sodium bisulfite with a solids content of 20 mass %.

Polymerization of Blocked Isocyanate Compound 100 parts by mass of a polyisocyanate compound having an isocyanurate structure (Duranate TPA, produced by Asahi Kasei Corporation) prepared using hexamethylene diisocyanate as a starting material, 55 parts by mass of propylene glycol monomethyl ether acetate, and 30 parts by mass of polyethylene glycol monomethyl ether (average molecular weight: 750) were placed in a flask equipped with a stirrer, a thermometer, and a reflux condenser tube. The resulting mixture was maintained in a nitrogen atmosphere at 70° C. for 4 hours. The temperature of the reaction mixture was then reduced to 50° C., and 47 parts by mass of methyl ethyl ketoxime was added dropwise. After the reaction mixture was subjected to infrared spectrum measurement, the disappearance of the isocyanate group absorption peak was confirmed, thus obtaining a blocked polyisocyanate agent with a solids content of 75 mass %.

Preparation of Water-Dispersible Blocked Isocyanate

Water was added to the above obtained block polyisocyanate agent, thus obtaining a blocked polyisocyanate aqueous dispersion (C-1) having a solids content of 40 mass %.

Polymerization of Water-Soluble Carbodiimide Compound 200 parts by mass of isophorone diisocyanate and 4 parts by mass of 3-methyl-1-phenyl-2-phosphorene-1-oxide (carbodiimidized catalyst) were added to a flask equipped with a thermometer, a nitrogen-gas-feeding tube, a reflux condenser, a dropping funnel, and a stirrer, and stirred in a nitrogen atmosphere at 180° C. for 10 hours, thereby obtaining an isocyanate-terminated isophorone carbodiimide (degree of polymerization: 5). Subsequently, 111.2 g of the obtained carbodiimide and 80 g of polyethylene glycol monomethyl ether (molecular weight: 400) were reacted at 100° C. for 24 hours. Water was gradually added thereto at 50° C., thereby obtaining transparent yellowish water-soluble carbodiimide compound (C-2) with a solids content of 40 mass %.

Melamine Cross-Linking Agent

Beckamine (registered trademark) M-3 (solids content concentration: 60%) produced by DIC Corporation was used as a melamine cross-linking agent (melamine cross-linking agent (C-3)).

Polymerization of Oxazoline Crosslinking Agent

A mixture of 58 parts by mass of ion-exchanged water and 58 parts by mass of isopropanol serving as an aqueous medium, and 4 parts by mass of a polymerization initiator (2,2'-azobis(2-amidinopropane) dihydrochloride) were placed in a flask with a thermometer, a nitrogen gas inlet tube, a reflux condenser, a dropping funnel, and a stirrer. Meanwhile, a mixture of 16 parts by mass of 2-isopropenyl-2-oxazoline serving as a polymerizable unsaturated monomer having an oxazoline group, 32 parts by mass of methoxypolyethylene glycol acrylate (average number of moles of ethylene glycol added: 9 mol, produced by Shin-Nakamura Chemical Co., Ltd.), and 32 parts by mass of methyl methacrylate were placed in the dropping funnel, and the mixture was dropped under a nitrogen atmosphere at 70° C. over 1 hour. After the completion of the dropping, the reaction solution was stirred for 9 hours and cooled, thus obtaining a water-soluble resin (C-4) having a solids content concentration of 40 mass % and having an oxazoline group.

Zirconia Particles 2283.6 g of pure water and 403.4 g of oxalic acid dihydrate were placed in a 3 L glass container, and the mixture was heated to 40° C. to prepare a 10.72 mass % oxalic acid aqueous solution. While stirring the aqueous solution, 495.8 g of a zirconium oxycarbonate powder ($ZrOCO_3$, produced by AMR International Corporation, 39.76 mass % in terms of $ZrO_2$) was gradually added thereto, followed by mixing for 30 minutes and then heating at 90° C. for 30 minutes. Subsequently, 1747.2 g of 25.0 mass % tetramethylammonium hydroxide aqueous solution (produced by Tama Chemical Co., Ltd.) was gradually added over 1 hour. At this point, the mixture was in the form of slurry and was contained in an amount of 4.0 mass % in terms of $ZrO_2$. The slurry was transferred into a stainless steel autoclave vessel, and subjected to a hydrothermal treatment at 145° C. for 5 hours. The product after the hydrothermal treatment completely isolated without any non-agglomerated material. The obtained sol had a $ZrO_2$ concentration of 4.0 mass %, and a pH of 6.8, and an average particle size of 19 nm. The sol, which was adjusted with pure water to have a $ZrO_2$ concentration of 2.0 mass %, had a transmittance of 88%. The transmission electron microscope observation of particles showed that most of the particles were agglomerated $ZrO_2$ primary particles having a size of about 7 nm. 4000 g of zirconia sol with a $ZrO_2$ concentration of 4.0 mass % obtained by the above hydrothermal treatment was washed and concentrated using an ultrafiltration apparatus by gradually adding pure water to obtain 953 g of zirconia sol having a $ZrO_2$ concentration of 13.1 mass %, a pH of 4.9, and a transmittance when the $ZrO_2$ concentration was 13.1 mass % of 76%.

After 3.93 g of a 20 mass % citric acid aqueous solution and 11.0 g of a 25 mass % tetramethylammonium hydroxide aqueous solution were added to 300 g of zirconia sol with a $ZrO_2$ concentration of 13.1 mass % obtained by the above washing and concentration, the mixture was further concentrated using an ultrafiltration apparatus, thus obtaining 129 g of a highly concentrated zirconia sol (D-1) with a $ZrO_2$ concentration of 30.5 mass %. The obtained highly concentrated zirconia sol had a pH of 9.3 and an average particle size of 19 nm. The zirconia sol had no sediment and was stable for one month or more at 50° C.

Zirconia Aqueous Dispersion

The zirconia sol obtained above and a polyacrylic acid dispersant (Aron A-30SL produced by Toa Gosei Co., Ltd.) were mixed to prepare a zirconia aqueous dispersion having a solids content concentration of 13 mass %. Specifically, a zirconia aqueous dispersion D-1 was obtained in which, of the solids content concentration, the dispersant was 3 mass % and zirconia was 10%.

Titania Particles 12.09 kg of a titanium tetrachloride aqueous solution containing titanium tetrachloride (produced by Osaka Titanium Technologies Co., Ltd.) in an amount of 7.75 mass % in terms of $TiO_2$ was mixed with 4.69 kg of ammonia water containing 15 mass % of ammonia (produced by Ube Industries, Ltd.) to prepare a white slurry solution having a pH of 9.5. Subsequently, the slurry was filtered and washed with pure water to obtain 9.87 kg of hydrous titanic acid cake having a solids content of 10 mass %. Subsequently, 11.28 kg of hydrogen peroxide water (produced by Mitsubishi Gas Chemical Company Inc.) containing 35 mass % of hydrogen peroxide and 20.00 kg of pure water were added to the cake, the cake was then heated under stirring at a temperature of 80° C. for 1 hour, and then 57.52 kg of pure water was added thereto to obtain 98.67 kg of an aqueous solution of peroxotitanic acid containing 1 mass % of peroxotitanic acid in terms of $TiO_2$. The aqueous solution of peroxotitanic acid was a transparent yellowish brown and had a pH of 8.5.

Subsequently, 4.70 kg of a cation exchange resin (produced by Mitsubishi Chemical Corporation) was mixed with 98.67 kg of the aqueous solution of peroxotitanic acid, and 12.33 kg of an aqueous potassium stannate solution containing 1 mass % of potassium stannate (produced by Showa Kako Co., Ltd.) in terms of $SnO_2$ was gradually added thereto under stirring. Subsequently, the cation exchange resin that contained potassium ions etc. was separated, and placed in an autoclave (produced by Taiatsu Techno Corporation; 120 L), and heated at 165° C. for 18 hours.

Subsequently, the resulting mixed aqueous solution was cooled to room temperature, and then concentrated using an ultrafiltration membrane apparatus (ACV-3010 produced by Asahi Kasei Corporation) to obtain 9.90 kg of an aqueous dispersion sol (D-2) containing titanium fine particles with a solids content of 10 mass %. Solids contained in the sol thus obtained were measured by the method described above, and they were titanium fine particles (primary particles) having a rutile-type crystal structure and formed of a complex oxide containing titanium and tin. Furthermore, the content of each of the metal components in the titanium fine particles was measured, and the metal content in terms of oxide was $TiO_2$: 87.2 mass %, $SnO_2$: 11.0 mass %, and $K_2O$: 1.8 mass %. The pH of the mixed aqueous solution was 10.0. The aqueous dispersion sol containing the titanium fine particles was transparent milky white, and the titanium fine particles contained in this aqueous dispersion sol had an average particle size of 35 nm, and the distribution frequency of coarse particles having a particle size of 100 nm or more was 0%. Additionally, the refractive index of the obtained titanium fine particles could be regarded as 2.42.

Titania Aqueous Dispersion

The titanium fine particles obtained above and a polyacrylic acid dispersant (Aron A-30SL, produced by Toa Gosei Co., Ltd.) were mixed to prepare a titania aqueous dispersion having a solids concentration of 13 mass %. Specifically, a titania aqueous dispersion D-2 was obtained in which, of the solids content concentration, the dispersant was 3 mass % and titania was 10%.

Zirconia/Titania Mixed Dispersion

The zirconia sol and titania fine particles obtained above, and the polyacrylic acid dispersant (Aron A-30SL produced by Toa Gosei Co., Ltd.) were mixed to prepare a zirconia/titania mixed aqueous dispersion having a solids content concentration of 13 mass %. Specifically, a mixed dispersion D-3 in which, of the solids content concentration, the dispersant was 3 mass %, zirconia was 7.5%, and titania was 2.5% was obtained.

Silica Particles

As silica particles, colloidal silica with a particle size of 40 nm and a solids content concentration of 30 mass % was used as D-4.

Silica Particles

Silica particles having a particle size of 450 nm and a solids content concentration of 40 mass % were used as D-5 to provide smoothness.

Surfactant

In order to improve the leveling property of the coating film for forming an easy-to-adhere resin layer, a silicone-based surfactant having a solids content concentration of 100 mass % was used as E-1.

Preparation of Coating Solution for Forming Easy-to-Adhere-Layer

The following coating materials were mixed to prepare a coating solution P-1.

Water: 47.52 parts by mass
Isopropanol: 25.00 parts by mass
Polyester resin (Aw-1): 17.75 parts by mass
Water-dispersible blocked isocyanate compound (C-1): 4.76 parts by mass
Zirconia/Titania mixed aqueous dispersion (D-3): 4.88 parts by mass
Silica particles (D-5): 0.06 parts by mass (silica sol with an average particle size of 450 nm, solids content concentration: 40 mass %)
Silicone-based surfactant (E-1): 0.03 parts by mass (silicone-based surfactant, solids content concentration: 100 mass %)

In the same manner, the mixing ratio of coating materials was set as shown in Table 2, thus preparing coating solutions P-2 to P-14.

TABLE 2

| | Polyester | | | Urethane | | Cross-linking agent | | | | Particles 1 | | | | Particles 2 | Surfactant |
|---|---|---|---|---|---|---|---|---|---|---|---|---|---|---|---|
| | Aw-1 | Aw-2 | Aw-3 | B-1 | B-2 | C-1 | C-2 | C-3 | C-4 | D-1 | D-2 | D-3 | D-4 | D-5 | E-1 |
| P-1 | 70 | | | | | 30 | | | | | | 10 | | 0.4 | 0.43 |
| P-2 | 60 | | | | | 40 | | | | | | 14 | | 0.4 | 0.43 |
| P-3 | 80 | | | | | 20 | | | | | | 5 | | 0.4 | 0.43 |
| P-4 | 40 | | | 30 | | 30 | | | | | | 12 | | 0.4 | 0.43 |
| P-5 | 70 | | | | | | 30 | | | | | 10 | | 0.4 | 0.43 |
| P-6 | | 80 | | | | 20 | | | | | | 14 | | 0.4 | 0.43 |
| P-7 | | 70 | | | | | | 30 | | | | 5 | 5 | 0.4 | 0.43 |
| P-8 | 70 | | | | | | | | 30 | | | 10 | | 0.4 | 0.43 |
| P-9 | 70 | | | | | 30 | | | | 10 | | | | 0.4 | 0.43 |
| P-10 | 70 | | | | | 30 | | | | | 10 | | | 0.4 | 0.43 |
| P-11 | | | 65 | | | 35 | | | | | | 10 | | 0.4 | 0.43 |
| P-12 | | 50 | | | 50 | | | | | | | | 10 | 0.4 | 0.43 |
| P-13 | | | 80 | | | | | 20 | | | | | 10 | 0.4 | 0.43 |
| P-14 | | | | 50 | | 50 | | | | | | 30 | | 0.4 | 0.43 |

The described data are solids content defined by parts by mass.

Example 1

Polyethylene terephthalate pellet (R1) was supplied to an extruder and melted at 285° C. This polymer was filtered through a sintered stainless-steel filter material (nominal filtration accuracy: 10-μm particles are 95% cut) and extruded from the outlet into a sheet form. The sheet-form polymer was then brought into contact with a casting drum (surface temperature: 30° C.) by using an electrostatic application casting method to solidify the polymer by cooling, thereby preparing an unstretched film. The unstretched film was uniformly heated to 75° C. by using heating rolls, and then heated to 85° C. using a non-contact heater, followed by roll drawing (drawing in the longitudinal direction) to a 1.4-fold film. Subsequently, the coating solution (P-1) for forming an easy-to-adhere resin layer was applied to both surfaces of the obtained uniaxially stretched film by roll coating, and then dried at 80° C. for 20 seconds. Adjustment was made so that the amount of the applied coating solution for forming an easy-to-adhere layer was 0.09 g/m² after final drying (after being biaxially drawn). Thereafter, the film was guided to a tenter, preheated at 105° C., and laterally stretched 4.0-fold at 95° C. With the width fixed, the film was subjected to heat fixation at 230° C. for 5 seconds, and further relaxed by 4% in the width direction at 180° C., thereby obtaining a polyethylene terephthalate film with a thickness of 50 μm.

The following hard coating solution (H-1) was applied to one surface of each of the polyethylene terephthalate films having an easy-to-adhere resin layer by using a Mayer bar such that the film thickness was 10 μm on a dry film basis, and dried at 80° C. for 1 minute. The films were then irradiated with UV light (integrated light intensity: 200 mJ/cm$^2$), thereby obtaining hard coating films.

Hard-Coating-Layer-Forming Coating Solution H-1

95 parts by mass of a urethane acrylate hard coating agent (Beamset (registered trademark) 577, produced by Arakawa Chemical Industries Ltd., solids content concentration 100%), 5 parts by mass of a photopolymerization initiator (Irgacure (registered trademark) 184, produced by BASF Japan Ltd., solids content concentration 100%), and 0.1 parts by mass of a leveling agent (BYK307, produced by BYK Japan KK, solids content concentration 100%) were mixed; and the mixture was diluted with a solvent (toluene/MEK=1/1), thereby preparing a hard-coating-layer-forming coating solution H-1 with a solids content concentration of 40%.

Examples 2 and 3

A polyester film and a hard coating film were prepared in the same manner as in Example 1, except that the draw ratio in the longitudinal direction was changed as shown in Table 3.

Example 4

A polyester film and a hard coating film were prepared in the same manner as in Example 1, except that the draw ratio in the width direction was changed to 5.5-fold, and the heat fixation temperature was changed to 190° C.

Examples 5 to 14

Polyester films and hard coating films were obtained in the same manner as in Example 1, except that the coating solution for forming an easy-to-adhere resin layer was changed to P-2 to P-11 as shown in Table 3.

Examples 15 and 16

Polyester films and hard coating films were obtained in the same manner as in Example 1, except that the hard coating solution H-1 was changed to the following H-2 and H-3 as shown in Table 4.

Hard-Coating-Layer-Forming Coating Solution: H-2

30 parts by mass of pentaerythritol tri- and tetraacrylate (produced by Toagosei Co., Ltd., Aronix (registered trademark) M-306, solids content concentration 100%), 65 parts by mass of polyester acrylate (produced by Toagosei Co., Ltd., Aronix (registered trademark) M9050, solids content 100%), 5 parts by mass of photoinitiator (BASF Japan, Irgacure (registered trademark) 907, solids content concentration 100%), and 0.1 parts by mass of a leveling agent (BYK307 produced by BYK Japan KK, solids content concentration 100%) were mixed; and the mixture was diluted with a solvent (toluene/MEK=1/1), thereby preparing a hard coating solution (H-2) with a concentration of 40 mass %.

Hard-Coating-Layer-Forming Coating Solution: H-3

0.1 parts by mass of a leveling agent (produced by BYK-Chemie Japan, BYK307, concentration: 100%) were added to 100 parts by mass of a hard coating material (produced by JSR Corporation, OPSTAR (registered trademark) Z7503, concentration: 75%), and the mixture was diluted with methyl ethyl ketone, thereby preparing a hard coating solution (H-3) with a solids content concentration of 40 mass %.

Comparative Example 1

A polyester film and a hard coating film were obtained in the same manner as in Example 1, except that drawing in the longitudinal direction was not performed, and only lateral uniaxial drawing in the width direction was performed.

Comparative Example 2

A polyester film and a hard coating film were prepared in the same manner as in Example 4, except that drawing in the longitudinal direction was not performed, and only lateral uniaxial drawing in the width direction was performed.

Comparative Examples 3 to 7

A polyester film and a hard coating film were obtained in the same manner as in Example 1, except that the heat fixation temperature was changed to 220° C., and the PET pellet and the thickness shown in Table 1 were used.

Comparative Example 8

A polyester film and a hard coating film were obtained in the same manner as in Example 1, except that the draw ratio in the longitudinal direction was changed to 3.4-fold.

Comparative Examples 9 to 11

Polyester films and hard coating films were obtained in the same manner as in Example 1, except that the coating solution was changed to P-12 to P-14 as shown in Table 3.

The evaluation results are shown in Tables 3 and 4.

TABLE 3

| | PET pellet | | PET film | | | | |
|---|---|---|---|---|---|---|---|
| | | Intrinsic viscosity (dl/g) | Intrinsic viscosity (dl/g) | Easy-to-adhere resin layer | Draw ratio | | Draw temperature in the longitudinal direction (° C.) |
| | Type | | | | longitudinal direction | Width direction | |
| Ex. 1 | R1 | 0.62 | 0.58 | P-1 | 1.4 | 4.0 | 85 |
| Ex. 2 | R1 | 0.62 | 0.58 | P-1 | 1.7 | 4.0 | 85 |
| Ex. 3 | R1 | 0.62 | 0.58 | P-1 | 2.0 | 4.0 | 85 |
| Ex. 4 | R1 | 0.62 | 0.58 | P-1 | 1.4 | 5.5 | 85 |
| Ex. 5 | R1 | 0.62 | 0.58 | P-2 | 1.4 | 4.0 | 85 |

TABLE 3-continued

| | | | | | | | |
|---|---|---|---|---|---|---|---|
| Ex. 6 | R1 | 0.62 | 0.58 | P-3 | 1.4 | 4.0 | 85 |
| Ex. 7 | R1 | 0.62 | 0.58 | P-4 | 1.4 | 4.0 | 85 |
| Ex. 8 | R1 | 0.62 | 0.58 | P-5 | 1.4 | 4.0 | 85 |
| Ex. 9 | R1 | 0.62 | 0.58 | P-6 | 1.4 | 4.0 | 85 |
| Ex. 10 | R1 | 0.62 | 0.58 | P-7 | 1.4 | 4.0 | 85 |
| Ex. 11 | R1 | 0.62 | 0.58 | P-8 | 1.4 | 4.0 | 85 |
| Ex. 12 | R1 | 0.62 | 0.58 | P-9 | 1.4 | 4.0 | 85 |
| Ex. 13 | R1 | 0.62 | 0.58 | P-10 | 1.4 | 4.0 | 85 |
| Ex. 14 | R1 | 0.62 | 0.58 | P-11 | 1.4 | 4.0 | 85 |
| Ex. 15 | R1 | 0.62 | 0.58 | P-1 | 1.4 | 4.0 | 85 |
| Ex. 16 | R1 | 0.62 | 0.58 | P-1 | 1.4 | 4.0 | 85 |
| Comp. Ex. 1 | R1 | 0.62 | 0.58 | P-1 | 1.0 | 4.0 | — |
| Comp. Ex. 2 | R1 | 0.62 | 0.58 | P-1 | 1.0 | 5.5 | — |
| Comp. Ex. 3 | R1 | 0.62 | 0.58 | P-1 | 1.4 | 4.0 | 85 |
| Comp. Ex. 4 | R1 | 0.62 | 0.58 | P-1 | 1.4 | 4.0 | 85 |
| Comp. Ex. 5 | R1 | 0.62 | 0.58 | P-1 | 1.4 | 4.0 | 85 |
| Comp. Ex. 6 | R2 | 0.58 | 0.54 | P-1 | 1.4 | 4.0 | 85 |
| Comp. Ex. 7 | R3 | 0.75 | 0.69 | P-1 | 1.4 | 4.0 | 85 |
| Comp. Ex. 8 | R1 | 0.62 | 0.58 | P-1 | 3.4 | 4.0 | 85 |
| Comp. Ex. 9 | R1 | 0.62 | 0.58 | P-12 | 1.4 | 4.0 | 85 |
| Comp. Ex. 10 | R1 | 0.62 | 0.58 | P-13 | 1.4 | 4.0 | 85 |
| Comp. Ex. 11 | R1 | 0.62 | 0.58 | P-14 | 1.4 | 4.0 | 85 |

| | PET film | | | | | |
|---|---|---|---|---|---|---|
| | Preheating | | | | Refractive index of PET film | |
| | temperature in the width direction (° C.) | Heat fixation temperature (° C.) | Thickness (μm) | Density (g/cm3) | Longitudinal direction (Bending direction) | Width direction (folding direction) | Thickness direction |
| Ex. 1 | 105 | 230 | 50 | 1.385 | 1.596 | 1.684 | 1.516 |
| Ex. 2 | 105 | 230 | 50 | 1.385 | 1.602 | 1.681 | 1.512 |
| Ex. 3 | 105 | 230 | 50 | 1.387 | 1.609 | 1.679 | 1.509 |
| Ex. 4 | 105 | 190 | 50 | 1.383 | 1.591 | 1.694 | 1.513 |
| Ex. 5 | 105 | 230 | 50 | 1.385 | 1.596 | 1.684 | 1.516 |
| Ex. 6 | 105 | 230 | 50 | 1.385 | 1.596 | 1.684 | 1.516 |
| Ex. 7 | 105 | 230 | 50 | 1.385 | 1.596 | 1.684 | 1.516 |
| Ex. 8 | 105 | 230 | 50 | 1.385 | 1.596 | 1.684 | 1.516 |
| Ex. 9 | 105 | 230 | 50 | 1.385 | 1.596 | 1.684 | 1.516 |
| Ex. 10 | 105 | 230 | 50 | 1.385 | 1.596 | 1.684 | 1.516 |
| Ex. 11 | 105 | 230 | 50 | 1.385 | 1.596 | 1.684 | 1.516 |
| Ex. 12 | 105 | 230 | 50 | 1.385 | 1.596 | 1.684 | 1.516 |
| Ex. 13 | 105 | 230 | 50 | 1.385 | 1.596 | 1.684 | 1.516 |
| Ex. 14 | 105 | 230 | 50 | 1.385 | 1.596 | 1.684 | 1.516 |
| Ex. 15 | 105 | 230 | 50 | 1.385 | 1.596 | 1.684 | 1.516 |
| Ex. 16 | 105 | 230 | 50 | 1.385 | 1.596 | 1.684 | 1.516 |
| Comp. Ex. 1 | 105 | 220 | 50 | 1.380 | 1.588 | 1.694 | 1.522 |
| Comp. Ex. 2 | 105 | 190 | 50 | 1.383 | 1.584 | 1.701 | 1.512 |
| Comp. Ex. 3 | 105 | 220 | 50 | 1.381 | 1.601 | 1.684 | 1.524 |
| Comp. Ex. 4 | 105 | 220 | 25 | 1.381 | 1.591 | 1.676 | 1.530 |
| Comp. Ex. 5 | 105 | 220 | 75 | 1.381 | 1.623 | 1.690 | 1.526 |
| Comp. Ex. 6 | 105 | 220 | 50 | 1.382 | 1.598 | 1.682 | 1.524 |
| Comp. Ex. 7 | 105 | 220 | 50 | 1.380 | 1.603 | 1.686 | 1.522 |
| Comp. Ex. 8 | 105 | 230 | 50 | 1.396 | 1.650 | 1.669 | 1.496 |

TABLE 3-continued

| | | | | | | | |
|---|---|---|---|---|---|---|---|
| Comp. Ex. 9 | 105 | 230 | 50 | 1.385 | 1.596 | 1.684 | 1.516 |
| Comp. Ex. 10 | 105 | 230 | 50 | 1.385 | 1.596 | 1.684 | 1.516 |
| Comp. Ex. 11 | 105 | 230 | 50 | 1.385 | 1.596 | 1.684 | 1.516 |

| | PET film | | | | | | |
|---|---|---|---|---|---|---|---|
| | Refractive index of easy-to-adhere-resin layer | Continuous bending test with a bend radius of 1.5 mm | Continuous bending test with a bend radius of 0.5 mm | Indentation depth after unloading a test force (μm) | Total light transmittance (%) | Haze (%) | Maximum heat shrinkage (%) |
| Ex. 1 | 1.583 | ○ | ○ | 1.48 | 90 | 0.9 | 1.4 |
| Ex. 2 | 1.583 | ○ | ○ | 1.47 | 90 | 0.9 | 1.5 |
| Ex. 3 | 1.583 | ○ | ○ | 1.42 | 90 | 0.9 | 1.6 |
| Ex. 4 | 1.583 | ○ | ○ | 1.35 | 90 | 0.9 | 4.4 |
| Ex. 5 | 1.582 | ○ | ○ | 1.48 | 89 | 1.1 | 1.4 |
| Ex. 6 | 1.583 | ○ | ○ | 1.48 | 91 | 0.8 | 1.4 |
| Ex. 7 | 1.561 | ○ | ○ | 1.48 | 90 | 1.2 | 1.4 |
| Ex. 8 | 1.580 | ○ | ○ | 1.48 | 89 | 1.0 | 1.4 |
| Ex. 9 | 1.558 | ○ | ○ | 1.48 | 90 | 1.2 | 1.4 |
| Ex. 10 | 1.554 | ○ | ○ | 1.48 | 90 | 1.5 | 1.4 |
| Ex. 11 | 1.580 | ○ | ○ | 1.48 | 89 | 1.0 | 1.4 |
| Ex. 12 | 1.581 | ○ | ○ | 1.48 | 89 | 0.9 | 1.4 |
| Ex. 13 | 1.588 | ○ | ○ | 1.48 | 89 | 1.2 | 1.4 |
| Ex. 14 | 1.592 | ○ | ○ | 1.48 | 90 | 1.5 | 1.4 |
| Ex. 15 | 1.583 | ○ | ○ | 1.48 | 90 | 0.9 | 1.4 |
| Ex. 16 | 1.583 | ○ | ○ | 1.48 | 90 | 0.9 | 1.4 |
| Comp. Ex. 1 | 1.583 | ○ | x | 1.64 | 91 | 0.9 | 1.4 |
| Comp. Ex. 2 | 1.583 | ○ | x | 1.56 | 91 | 0.9 | 3.7 |
| Comp. Ex. 3 | 1.583 | ○ | ○ | 1.60 | 91 | 0.8 | 1.8 |
| Comp. Ex. 4 | 1.583 | ○ | ○ | 1.62 | 91 | 0.8 | 1.8 |
| Comp. Ex. 5 | 1.583 | x | ○ | 1.63 | 91 | 0.8 | 1.8 |
| Comp. Ex. 6 | 1.583 | ○ | ○ | 1.66 | 91 | 0.8 | 1.8 |
| Comp. Ex. 7 | 1.583 | ○ | ○ | 1.56 | 91 | 0.8 | 1.8 |
| Comp. Ex. 8 | 1.583 | x | ○ | 1.36 | 91 | 0.9 | 1.0 |
| Comp. Ex. 9 | 1.540 | ○ | ○ | 1.48 | 91 | 0.8 | 1.4 |
| Comp. Ex. 10 | 1.589 | ○ | ○ | 1.48 | 90 | 1.1 | 1.4 |
| Comp. Ex. 11 | 1.557 | ○ | ○ | 1.48 | 91 | 1.3 | 1.4 |

The "Intrinsic viscosity," "Density," "Refractive index of PET film," "Continuous bending test with a bend radius of 1.5 mm," "Continuous bending test with a bend radius of 0.5 mm," "Indentation depth after unloading a test force," "Total light transmittance," "Haze," and "Maximum heat shrinkage" in the "PET film" column are evaluation results of a film having an easy-to-adhere resin layer stacked on the PET film but not having a hard coating layer stacked thereon.

TABLE 4

| | Hard coating film | | | | | |
|---|---|---|---|---|---|---|
| | Hard coating layer | Refractive index of hard coating layer | Improvement in interference mottling before continuous bending test | Continuous bending test with a bend radius of 3.0 mm | Improvement in interference mottling after continuous bending test | Pencil hardness |
| Example 1 | H-1 | 1.520 | ◉ | ○ | ◉ | 3H |
| Example 2 | H-1 | 1.520 | ◉ | ○ | ◉ | 3H |
| Example 3 | H-1 | 1.520 | ◉ | ○ | ◉ | 3H |
| Example 4 | H-1 | 1.520 | ◉ | ○ | ◉ | 3H |
| Example 5 | H-1 | 1.520 | ◉ | ○ | ◉ | 3H |
| Example 6 | H-1 | 1.520 | ◉ | ○ | ◉ | 3H |
| Example 7 | H-1 | 1.520 | ○ | ○ | ◉ | 3H |
| Example 8 | H-1 | 1.520 | ◉ | ○ | ◉ | 3H |

TABLE 4-continued

| | Hard coating film | | | | | |
|---|---|---|---|---|---|---|
| | Hard coating layer | Refractive index of hard coating layer | Improvement in interference mottling before continuous bending test | Continuous bending test with a bend radius of 3.0 mm | Improvement in interference mottling after continuous bending test | Pencil hardness |
| Example 9 | H-1 | 1.520 | ○ | ○ | ○ | 3H |
| Example 10 | H-1 | 1.520 | ○ | ○ | ○ | 3H |
| Example 11 | H-1 | 1.520 | ◎ | ○ | ○ | 3H |
| Example 12 | H-1 | 1.520 | ◎ | ○ | ◎ | 3H |
| Example 13 | H-1 | 1.520 | ◎ | ○ | ◎ | 3H |
| Example 14 | H-1 | 1.520 | ○ | ○ | Δ | 3H |
| Example 15 | H-2 | 1.530 | ○ | ○ | ○ | 3H |
| Example 16 | H-3 | 1.510 | ○ | ○ | ○ | 3H |
| Comparative Example 1 | H-1 | 1.520 | ○ | × | × | 1H |
| Comparative Example 2 | H-1 | 1.520 | ○ | × | × | 2H |
| Comparative Example 3 | H-1 | 1.520 | ◎ | ○ | ◎ | 2H |
| Comparative Example 4 | H-1 | 1.520 | ◎ | ○ | ◎ | 2H |
| Comparative Example 5 | H-1 | 1.520 | ◎ | ○ | ○ | 2H |
| Comparative Example 6 | H-1 | 1.520 | ○ | ○ | ○ | 2H |
| Comparative Example 7 | H-1 | 1.520 | ○ | ○ | ○ | 2H |
| Comparative Example 8 | H-1 | 1.520 | ○ | × | × | 3H |
| Comparative Example 9 | H-1 | 1.520 | × | ○ | × | 3H |
| Comparative Example 10 | H-1 | 1.520 | ◎ | ○ | × | 3H |
| Comparative Example 11 | H-1 | 1.520 | ○ | ○ | × | 2H |

When the polyester film having the easy-to-adhere layer had a refractive index in the predetermined range, and the hard coating layer was formed on the easy-to-adhere resin layer of the polyester film formed by curing a composition containing a polyester resin and at least one compound selected from titanium compounds and zirconium compounds as in Examples 1 to 16, the hard coat had sufficient pencil hardness, and the interface mottling improvement after the continuous bending test was high.

The observation of the cross-section of each sample in the Examples using a transmission electron microscope showed that the number of particles contained in the easy-to-adhere resin layer in the folding direction (width direction) was reduced as compared to the particles in the bending direction, i.e., the longitudinal direction.

In Comparative Examples 1 to 8 in which the polyester film-forming conditions were changed, since the refractive index of the polyester film having an easy-to-adhere resin layer was not in the optimum range, the obtained hard coating film did not have sufficient pencil hardness.

In Comparative Example 9 in which the easy-to-adhere resin layer was changed, since neither a titanium compound nor a zirconia compound was contained, and the adjustment of the refractive index of the easy-to-adhere resin layer was insufficient, improvement in interference mottling was not observed from before the bending test of the hard coating film. Further, the dispersibility of silica that was used in place of the metal compound was poor, and the interference mottling after the bending test was also deteriorated.

In Comparative Example 10 in which the easy-to-adhere resin layer was changed, improvement in interference mottling before the bending test was observed; however, the dispersibility of silica in which the titanium compound was used in place of the zirconia compound was poor, and the interference mottling after the bending test was deteriorated due to the generation of cracks on the easy-to-adhere resin layer.

In Comparative Example 11 in which the easy-to-adhere resin layer was changed, the addition of a large number of titanium/zirconia mixed oxides was required for adjusting the refractive index due to the absence of a polyester resin. This caused the agglomeration of metal oxides in the coating film, resulting in deterioration of interference mottling after the bending test.

The hard coating films obtained in the Examples and Comparative Examples were each laminated on an organic EL module via a 25-μm-thick adhesive layer, thereby preparing foldable smartphone type displays that can be folded in half at their center, with a radius of 3 mm, which corresponds to the bend radius in FIG. 1. Each hard coating film was provided on the surface of the single continuous display via the folding portion so that the hard coating layer was positioned as the front surface of the display. The displays prepared using the hard coating films of the Examples were satisfactory in terms of operation and visibility as a portable smartphone that is foldable in half at their center. The surface of these displays was also not dented by external forces. On the other hand, the foldable displays prepared by using the hard coating films of the Comparative Examples were not so desirable because they appeared to develop image distortion at the folding portion of the display as the frequency of use increased, and visibility apparently becomes poor due to the generation of interference mottling. Some had dents and scratches on the surface.

INDUSTRIAL APPLICABILITY

While maintaining its suitability in mass production, the foldable display using the hard coating film for foldable displays of the present invention is unlikely to deform after the hard coating film positioned on the front surface of the foldable display is repeatedly folded, thus not causing image distortion at the folding portion of the display. In particular, a mobile device or image display device equipped with the foldable display using the hard coating film of the present invention as a surface protection film provides beautiful images and has a great deal of functionality, while being highly convenient such as in terms of portability.

DESCRIPTION OF THE REFERENCE NUMERALS

1: foldable display
11: bend radius
2: polyester film for surface protection films of foldable displays
21: folding portion
22: bending direction (the direction orthogonal to the folding portion)

The invention claimed is:

1. A hard coating film for a foldable display, the hard coating film comprising
   a polyester film being a polyethylene terephthalate film and having a thickness of 10 to 80 µm and a draw ratio of 1.2-fold to 2.0-fold in the longitudinal direction,
   an easy-to-adhere resin layer, and
   a hard coating layer, the easy-to-adhere resin layer and the hard coating layer being stacked in this order on at least one surface of the polyester film,
   wherein
   the easy-to-adhere resin layer is a cured product of a composition containing
      at least one compound selected from the group consisting of titanium compounds and zirconium compounds, and
      a polyester resin, which is formed from a dicarboxylic acid component and a diol component, containing a naphthalene dicarboxylic acid component as at least part of the dicarboxylic acid component, and
   the polyester film having the easy-to-adhere resin layer stacked thereon but not yet having the hard coating layer stacked thereon satisfies the following conditions (1) to (4):
   (1) the polyester film has a refractive index in the bending direction of 1.590 to 1.620,
   (2) the polyester film has a refractive index in the direction of a folding portion of 1.670 to 1.700,
   (3) the polyester film has a refractive index in the thickness direction of 1.520 or less, and
   (4) the polyester film has a density of 1.380 g/cm$^3$ or more,
   wherein the bending direction refers to a direction orthogonal to the folding portion of the polyester film to be folded.

2. The hard coating film for a foldable display according to claim 1, wherein the easy-to-adhere resin layer has a refractive index lower than the refractive index in the bending direction and the refractive index in the direction of the folding portion of the polyester film having the easy-to-adhere resin layer stacked thereon but not yet having the hard coating layer stacked thereon, and the easy-to-adhere resin layer has a refractive index higher than the refractive index of the hard coating layer.

3. The hard coating film for a foldable display according to claim 1, wherein the easy-to-adhere resin layer has a refractive index that satisfies the following conditions (5) and (6):
   (5) the easy-to-adhere resin layer has a refractive index lower than the refractive index in the bending direction of the polyester film having the easy-to-adhere resin layer stacked thereon but not yet having the hard coating layer stacked thereon, and the difference in refractive index is more than 0 and 0.07 or less, and
   (6) the easy-to-adhere resin layer has a refractive index lower than the refractive index in the direction of the folding portion of the polyester film having the easy-to-adhere resin layer stacked thereon but not yet having the hard coating layer stacked thereon, and the difference in refractive index is 0.080 or more and 0.150 or less.

4. The hard coating film for a foldable display according to claim 1, wherein the polyester film having the easy-to-adhere resin layer stacked thereon but not yet having the hard coating layer stacked thereon has a total light transmittance of 85% or more, a haze of 3% or less, and a maximum heat shrinkage of 6% or less.

5. The hard coating film for a foldable display according to claim 1, wherein the hard coating layer has a thickness of 1 to 50 µm.

6. A foldable display comprising the hard coating film for a foldable display of claim 5,
   wherein
   the hard coating film is disposed as a surface protection film such that the hard coating layer becomes the front surface, and
   the hard coating film is a single continuous film placed through the folding portion of the foldable display.

7. A mobile device comprising the foldable display of claim 6.

* * * * *